United States Patent
Hastings et al.

(10) Patent No.: US 9,189,789 B1
(45) Date of Patent: Nov. 17, 2015

(54) METHODS, SYSTEMS, AND ARTICLES OF MANUFACTURE FOR FULFILLING A LOAN REQUEST OF A BUSINESS ENTITY

(75) Inventors: Alexandra C. Hastings, Brookline, MA (US); Harish K. B. Bellamane, Sunnyvale, CA (US); Garrett C. Morimoto, Saratoga, CA (US)

(73) Assignee: INTUIT INC., Mountain View, CA (US)

( * ) Notice: Subject to any disclaimer, the term of this patent is extended or adjusted under 35 U.S.C. 154(b) by 55 days.

(21) Appl. No.: 13/094,821

(22) Filed: Apr. 27, 2011

(51) Int. Cl.
*G06Q 30/00* (2012.01)
*G06Q 40/02* (2012.01)

(52) U.S. Cl.
CPC .............. *G06Q 30/00* (2013.01); *G06Q 40/025* (2013.01)

(58) Field of Classification Search
CPC ....... G06Q 30/00; G06Q 40/06; G06Q 20/22; G06Q 40/02; G06Q 40/025
USPC .......... 705/35, 36, 37, 38, 30, 16, 7.29, 26.35
See application file for complete search history.

(56) References Cited

U.S. PATENT DOCUMENTS

| | | | |
|---|---|---|---|
| 2003/0061151 A1 | 3/2003 | Hershey | |
| 2003/0171980 A1* | 9/2003 | Keiser | G06Q 10/063 705/7.11 |
| 2006/0136330 A1 | 6/2006 | DeRoy et al. | |
| 2007/0027791 A1* | 2/2007 | Young | G06Q 30/02 705/37 |
| 2007/0244779 A1 | 10/2007 | Wolff | |
| 2008/0249902 A1* | 10/2008 | Lehman | G06Q 40/02 705/30 |
| 2008/0319895 A1* | 12/2008 | Lazerson | G06Q 30/02 705/38 |
| 2009/0150169 A1* | 6/2009 | Kirkwood et al. | 705/1 |
| 2009/0164363 A1 | 6/2009 | Ahlers et al. | |

OTHER PUBLICATIONS

Office Action dated Dec. 16, 2011, Interview Summary dated Mar. 12, 2012, Amendment dated Mar. 16, 2012 and Final Office Action dated May 15, 2012 in U.S. Appl. No. 12/854,444, filed Jul. 28, 2010, (46 pages).

* cited by examiner

*Primary Examiner* — Robert R Niquette
*Assistant Examiner* — Rokib Masud
(74) *Attorney, Agent, or Firm* — Vista IP Law Group LLP; Gary D. Lueck

(57) ABSTRACT

Methods, systems, and articles of manufacture for fulfilling a loan request of a business entity. Embodiments are utilized to identify or receive a loan request from the business entity, identify or create borrower and lender profiles, and match the loan request for the business entity using compatibility criteria included in or associated with the profiles. Certain profiles may be created using electronic data from financial management system, and such data can be verified by the financial management system. Borrower-lender compatibility results can be displayed to lenders or business entity for review. A single lender may commit to fund a loan, or respective lenders may commit to fund respective loan portions, which may be presented to the business entity.

17 Claims, 17 Drawing Sheets

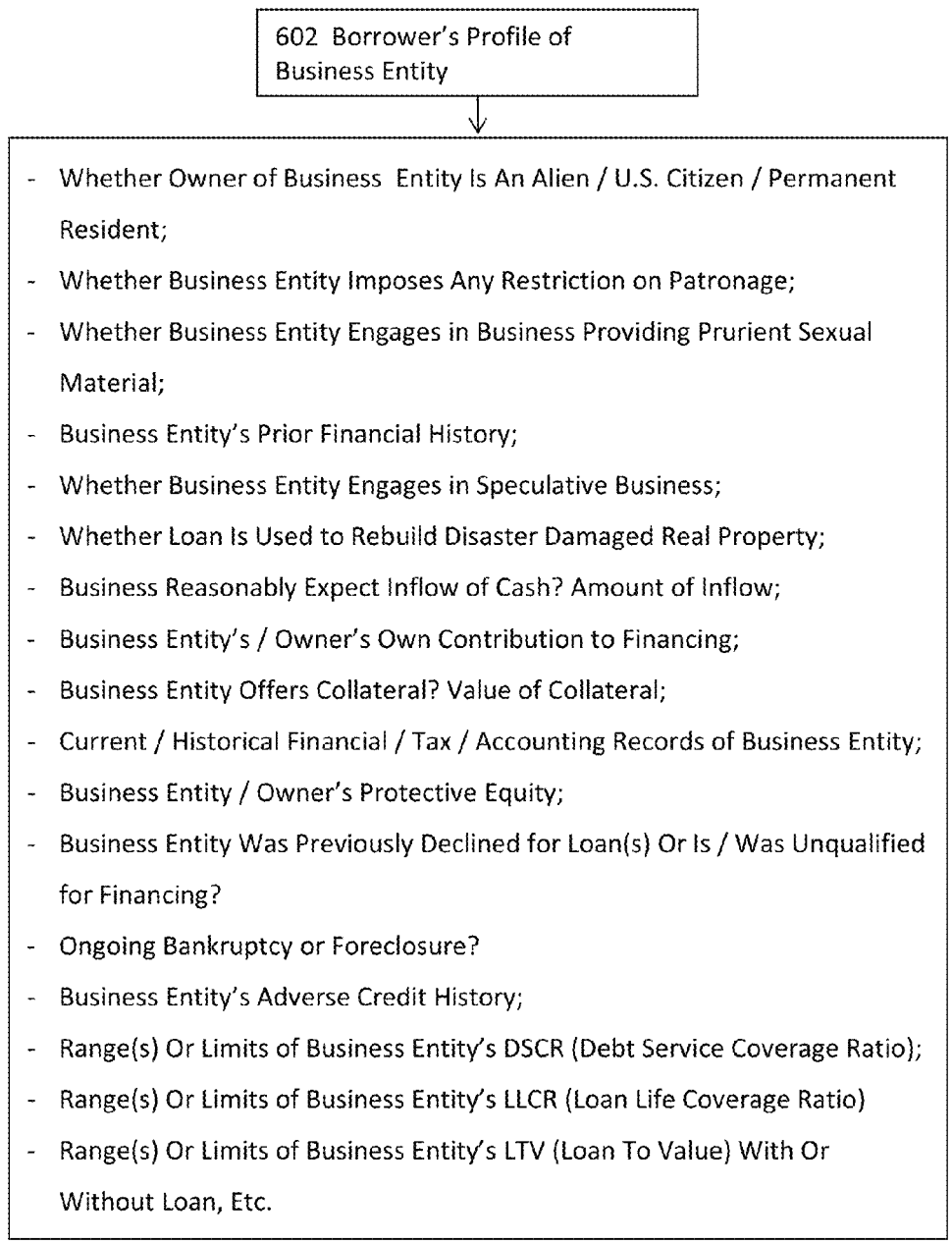

602 Borrower's Profile of Business Entity

- Whether Owner of Business Entity Is An Alien / U.S. Citizen / Permanent Resident;
- Whether Business Entity Imposes Any Restriction on Patronage;
- Whether Business Entity Engages in Business Providing Prurient Sexual Material;
- Business Entity's Prior Financial History;
- Whether Business Entity Engages in Speculative Business;
- Whether Loan Is Used to Rebuild Disaster Damaged Real Property;
- Business Reasonably Expect Inflow of Cash? Amount of Inflow;
- Business Entity's / Owner's Own Contribution to Financing;
- Business Entity Offers Collateral? Value of Collateral;
- Current / Historical Financial / Tax / Accounting Records of Business Entity;
- Business Entity / Owner's Protective Equity;
- Business Entity Was Previously Declined for Loan(s) Or Is / Was Unqualified for Financing?
- Ongoing Bankruptcy or Foreclosure?
- Business Entity's Adverse Credit History;
- Range(s) Or Limits of Business Entity's DSCR (Debt Service Coverage Ratio);
- Range(s) Or Limits of Business Entity's LLCR (Loan Life Coverage Ratio)
- Range(s) Or Limits of Business Entity's LTV (Loan To Value) With Or Without Loan, Etc.

FIG. 6 (Continued)

METHODS, SYSTEMS, AND ARTICLES OF MANUFACTURE FOR FULFILLING A LOAN REQUEST OF A BUSINESS ENTITY

BACKGROUND

Business entities, regardless of whether they are sole proprietorship(s), limited liability company(ies), limited liability partnership(s), S-corporation(s), or corporation(s) (hereinafter business entities or a business entity) regularly rely on various types of secured, unsecured, or demand loans for their daily operating needs due to various reasons. Lenders of all kinds are nonetheless particular about who they provide financing to. It is common for different lenders to have their respective set(s) of unique requirement(s), condition(s), covenant(s), policy(ies), or preference(s) (hereinafter criteria, compatibility criteria, a criterion, or a compatibility criterion) for their respective application, review, audit, underwriting, or financing grant processes (hereinafter loan process.) As a result, business often, if not always, have to go through an exhaustive search and loan process to identify the right lender, and such an exhaustive search and loan process often intervene with the operations of the businesses seeking financing.

For a small business, which commonly denotes a business entity that is privately owned and operated, with a small number of employees and relatively low volume of sales or a business entity, e.g., a business having fewer than 500 employees as recited by the U.S. Small Business Administration, presents greater risks in terms of financing for the lending institutions because of its relatively small size and uncertainties in its business and thus its ability to withstand economic changes. As a result, it is often more difficult for a small business entity to find and secure a loan to start, run, or grow its operations or to endure economic downturns or other hindrances such as natural or man-made disasters that adversely affect the operations of the small business.

SUMMARY

Disclosed are various embodiments relating to methods, systems, and articles of manufacture for fulfilling a loan request of a business entity.

In one or more embodiments, a method or system for fulfilling a loan request of a business entity includes the process or module for identifying or receiving a request for a loan for a loan amount from a business entity via a first computing network. The method or the system may further identify or create a borrower's profile for the business entity based at least in part upon the request in certain embodiments. In certain embodiments, the method or the system may comprise the process(es) or module(s) for identifying or receiving a lender's profile of a lender and for matching the request for the loan with the lender by determining compatibility for the business entity based at least in part upon the borrower's and lender's profiles.

In certain embodiments, the method or the system may comprise the process or module for enhancing credibility of the borrower's profile using electronic data from a financial management system, in which at least a part of the financial management system is utilized by the business entity. In certain embodiments, the method or the system may further present the lender's data to the business entity for review and the business entity data to the lender for review. The method or the system may further ensure correctness of the electronic data from the financial management system, determine or identify a rank, an order, or a weight of a lending criterion that is specified in the lender's profile. In certain embodiments, the process or module for processing an unspecified lending criterion in the lender's profile.

In certain embodiments, the process or module for using an electronic or digital signature or cryptography to prevent mutilation of the electronic data from the financial management system. In these embodiments, the method or the system also optionally verify the electronic data by using, for example, historical data, audit trails, or other financial data of the business entity. In certain embodiments, the process or module for processing the unspecified lending criterion in the lender's profile comprises the process or module for determining whether the unspecified lending criterion causes an impact on fulfillment of the request for the loan, identifying or determining a rank, an order, or one or more weights for one or more criteria in the lender's profile, and identifying the unspecified lending criterion in the lender's profile. In certain embodiments, the process or module for processing the unspecified lending criterion in the lender's profile may further comprise the process or module for identifying an average order, rank, or weight for a similar lending criterion in one or more other profiles of one or more other lenders, and using the average order, rank, or weight for the unspecified lending criterion for the lender. In certain embodiments, the process or module considers these one or more other lenders that are sufficiently similar to the lender.

In certain embodiments, the process or module for processing the unspecified lending criterion in the lender's profile comprises at least one of the process or module for distributing or scaling existing, specified lending criteria without considering the unspecified lending criterion, and the process or module for receiving an input from the lender for the unspecified lending criterion. In certain embodiments, the method or system may further comprise the process or module for receiving or identifying lender's authorization for transmitting the lender's data to the business entity. In these embodiments, the method or the system may comprise the process or module for receiving or identifying business entity's authorization for transmitting the business entity data to the lender and the process or module for providing a dedicated communication channel between the business entity and the lender.

In certain embodiments, the method or system may comprise the process or module for identifying a commitment of the lender to a portion of the loan amount, in which the portion of the loan amount does not entirely fulfill the request and the process or module for aggregating the commitment of the lender in the lender's data before presenting the lender's data to the business entity. In certain embodiments, the method or system may comprise the process or module for identifying one or more other lenders that are determined to match the request with respective compatibility for each of the one or more lenders, the process or module for identifying respective commitment for another portion of the loan amount from the each of the one or more lenders, and the process or module for dividing the loan amount among the one or more other lenders.

In certain of these embodiments, the method or the system may further comprise at least one of the process or module for determining or identifying a relative security interest with respect to the request for each of the lender and the one or more other lenders, the process or module for aggregating respective lender's data for the one or more other lenders and the lender into the lender's data before presenting the lender's data to the business entity, and the processes or modules for determining whether the specified criterion can be modified or relaxed and for modifying the rank, order, or weight of the specified criterion or one or more other criteria based at least in part upon a result of the action of determining whether the specified criterion can be modified or relaxed.

Certain embodiments are directed at a hardware computing system that is programmed, configured, or implemented to perform some or all of the disclosed processes or to comprise some or all of the disclosed modules. In certain embodiments, the system comprises at least one processor that is configured for performing a process, and the process comprises the processes or modules of identifying or receiving a request for a loan for a loan amount from a business entity, identifying or creating a borrower's profile for the business entity based at least in part upon the request, identifying or receiving a lender's profile of a lender, and matching the request for the loan with the lender by determining a compatibility for the business entity based at least in part upon the borrower's profile and the lender's profile.

In certain embodiments, the system may further be configured for performing the process, and the process may further comprise the processes or modules for enhancing credibility of The borrower's profile using electronic data from a financial management system, in which at least a part of the financial management system is utilized by the business entity, presenting lender's data to the business entity for review, presenting business entity data to the lender for review, ensuring correctness of the electronic data from the financial management system, determining or identifying a rank, order, or weight of a specified criterion in the lender's profile, and processing an unspecified lending criterion in the lender's profile.

In certain embodiments, the system may further be configured for performing the process, and the process may further comprise the processes or modules of identifying a commitment of the lender to a portion of the loan amount, in which the portion of the loan amount does not entirely fulfill the request and aggregating the commitment of the lender in the lender's data before presenting the lender's data to the business entity. Certain other embodiments are directed at a hardware computing system that is programmed, configured, or implemented to perform some or all of the aforementioned processes or to comprise some or all of the aforementioned modules in the preceding paragraphs.

In these embodiments, the system comprises at least one processor that is configured for performing a process, and the process comprises the processes or modules of identifying or receiving a request for a loan for a loan amount from a business entity, in which the business entity utilizes a financial management system, presenting the request of the business entity to one or more lenders, identifying a first lender's commitment to a first portion of the loan amount, in which the portion of the loan amount does not entirely fulfill the request, and presenting the first lender's commitment to the business entity for review.

In certain of these embodiments, the system is further configured for performing the process, and the process further comprises the processes or modules of presenting a list of financing sources to the business entity for review, providing a financing recommendation to the business entity based at least in part on the list of financing sources, improving a standing of the business entity by adjusting the loan amount based at least in part upon the recommendation, identifying electronic financial data for the business entity, in which at least some of the electronic financial data are pulled from or pushed by the financial management system that is utilized by the business entity, deriving or determining loan approval data based at least in part upon a first lender's profile of the first lender by using the electronic financial data, aggregating the request and the loan approval data into aggregated data, and presenting the aggregate data in a dashboard to the first lender.

In certain of these embodiments, the system is further configured for performing the process, and the process further comprises the processes or modules of identifying a second lender and a second lender's profile associated with the second lender, identifying a second lender's commitment to a second portion of the loan amount, in which the second portion does not entirely fulfill the request, presenting the second lender's commitment to the business entity for review, and determining or identifying respective security interest for the first lender and the second lender with respect to the request. More details about the computing system and the non-transitory computer accessible storage medium will be described in certain subsequent paragraphs with reference to various figures.

Certain other embodiments are directed at an article of manufacture including a non-transitory computer accessible storage medium that has stored thereupon a sequence of instructions whose execution by at least one processor causes the at least one processor to perform some or all of the aforementioned processes in the preceding paragraphs. In certain embodiments, the process comprises the processes or modules of identifying or receiving a request for a loan for a loan amount from a business entity, identifying or creating a borrower's profile for the business entity based at least in part upon the request, identifying or receiving a lender's profile of a lender, and matching the request for the loan with the lender by determining a compatibility for the business entity based at least in part upon the borrower's profile and the lender's profile.

In certain embodiments, the process may further comprise the processes or modules for enhancing credibility of The borrower's profile using electronic data from a financial management system, in which at least a part of the financial management system is utilized by the business entity, presenting lender's data to the business entity for review, presenting business entity data to the lender for review, ensuring correctness of the electronic data from the financial management system, determining or identifying a rank, order, or weight of a specified criterion in the lender's profile, and processing an unspecified lending criterion in the lender's profile. In certain embodiments, the process may further comprise the processes or modules of identifying a commitment of the lender to a portion of the loan amount, in which the portion of the loan amount does not entirely fulfill the request and aggregating the commitment of the lender in the lender's data before presenting the lender's data to the business entity.

Certain other embodiments are directed at an article of manufacture that includes a non-transitory computer readable storage medium having stored upon a sequence of instructions which, when executed by a computing system, causes the computing system to perform some or all of the disclosed processes or to comprise some or all of the aforementioned modules disclosed herein. In these embodiments, the process comprises the processes or modules of identifying or receiving a request for a loan for a loan amount from a business entity, in which the business entity utilizes a financial management system, presenting the request of the business entity to one or more lenders, identifying a first lender's commitment to a first portion of the loan amount, in which the portion of the loan amount does not entirely fulfill the request, and presenting the first lender's commitment to the business entity for review.

In some of these embodiments, the process may further comprise the processes or modules of presenting a list of financing sources to the business entity for review, providing a financing recommendation to the business entity based at least in part on the list of financing sources, improving a standing of the business entity by adjusting the loan amount based at least in part upon the recommendation, identifying electronic financial data for the business entity, in which at least some of the electronic financial data are pulled from or pushed by the financial management system that is utilized by the business entity, deriving or determining loan approval data based at least in part upon a first lender's profile of the first lender by using the electronic financial data, aggregating the request and the loan approval data into aggregated data, and presenting the aggregate data in a dashboard to the first lender.

In some of these embodiments, the process may further comprise the processes or modules of identifying a second lender and a second lender's profile associated with the second lender, identifying a second lender's commitment to a second portion of the loan amount, in which the second portion does not entirely fulfill the request, presenting the second lender's commitment to the business entity for review, and determining or identifying respective security interest for the first lender and the second lender with respect to the request. More details about the non-transitory computer accessible storage medium will be described in certain subsequent paragraphs with reference to various figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which.

DETAILED DESCRIPTION OF ILLUSTRATED EMBODIMENTS

Various embodiments are directed to methods, systems, and computer program products for fulfilling a request for loan of a business entity.

Figure 1A:
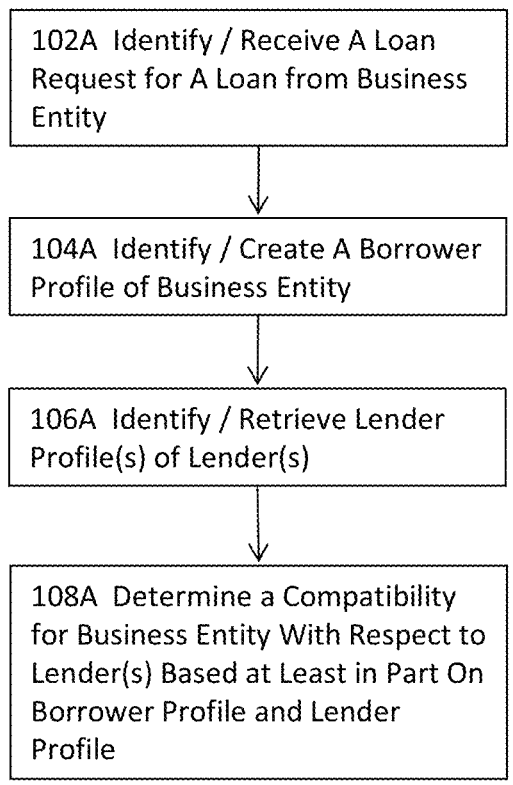
FIG. 1A illustrates a high level flow diagram of a method or system for implementing fulfilling a request for loan of a business entity in certain embodiments.

FIG. 1A illustrates a high level flow diagram of a method or system for fulfilling a request for loan of a business entity in certain embodiments. In one or more embodiments, the method or the system for fulfilling a request for loan of a business entity comprises the process or module 102A for identifying or receiving a request for a loan with a loan amount from a business entity. In certain embodiments, a business entity may comprise a sole proprietorship, a limited liability company, or a limited liability partnership, an s-corporation, a corporation, or any entity that has registered with a relevant authority (e.g., a state or federal agency.) In certain embodiments, a business entity may comprise a small entity. A small entity comprises a business entity that is privately owned and operated, with a small number of employees and relatively low volume of sales in certain embodiments. A small entity may also comprise a business entity that has fewer than 500 employees as required by the U.S. Small Business Administration for qualification for various Small Business Administration Programs.

In certain embodiments, the method or the system for fulfilling a request for loan of a business entity comprises the process or module (104A) for identifying or creating a borrower's profile of the business entity. In certain embodiments, the identification or creation of the borrower's profile is automated by pulling or receiving various types of electronic data pushed from various sources. In certain embodiments, the various sources comprise a financial management system (FMS). Various processes described herein may be one or more stand-along products executing on or accessible by the intermediate or host computer or may be a part of a desktop or on-line FMS such as MINT or QUICKEN, available from Intuit Inc., and which are linked to various consumer accounts to receive or retrieve item-level data within accounts. Such systems may categorize and display receipt and financial data to a user.

Various processes described herein may be a part of an accounting program such as INTUIT PAYROLL SERVICES or QUICKBOOKS, available from Intuit Inc. and other programs, that allow a user to manage payroll, inventory, sales, and other business matters such that various embodiments may be utilized to perform their intended functions. The term financial management system or FMS is defined to include, any computing system implemented, on-line or web-based, system, package, program, module, or application that gathers financial data, has the capability to receive or retrieve financial data including item-level electronic transaction data, analyze and categorize at least part of the financial data into various reports or displays that are provided to consumer, and provides consumer with the capability to conduct, and/or monitor, financial transactions.

Various types of financial management systems include, but are not limited to any of the following: an on-line, or web-based, or computing system implemented receipt collection financial management system, package, program, module, or application (generally, "system"), personal FMS, personal accounting system, personal asset management system, personal/home business inventory system, business accounting system, business FMS, business inventory system, business asset management system, healthcare expense tracking system, and data management system as discussed herein, and/or as known in the art at the time of filing, and/or as developed after the time of filing. Specific examples of financial management systems currently available and may be utilized to implement embodiments include, but are not limited to: QUICKEN, QUICKEN On-Line, QUICKBOOKS, QUICKBOOKS On-Line, FINANCEWORKS, PAYCYCLE, MINT and INTUIT PAYROLL SERVICES, available from Intuit Inc. of Mountain View, Calif.; MICROSOFT Money of Microsoft, Inc. of Redmond, Wash.; and various other financial management systems.

In certain embodiments, the method or the system for fulfilling a request for loan of a business entity comprises the process or module (106A) for identifying or retrieving a lender's profile. At 108A, the method or the system may comprise the process or module for fulfilling the loan request of the business entity by determining the compatibility between the business entity and the lender based on one or more compatibility criteria in both the borrower's profile of the business entity and the lender's profile in certain embodiments.

Figure 1B:
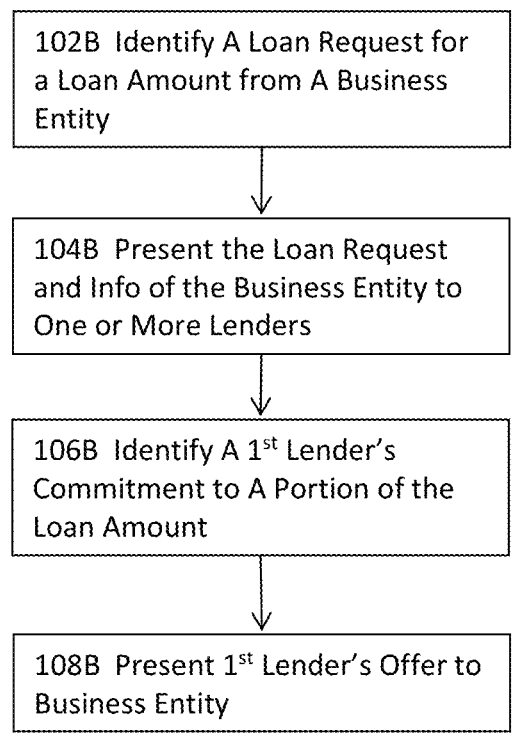
FIG. 1B illustrates another high level flow diagram of a method or system for implementing fulfilling a request for loan of a business entity in certain embodiments.

FIG. 1B illustrates another high level flow diagram of a method or system for implementing fulfilling a request for loan of a business entity in certain embodiments. In some embodiments, the method or the system for fulfilling a request for loan of a business entity comprises the process or module (102B) for identifying a request for a loan from a business entity. The method or the system may further comprise the process or module for presenting the request and/or other information or data about the business entity to one or more lenders at 104B in some embodiments. In some embodiments, the other information or data about the business entity comprise a borrower's profile for the business entity requesting for the loan. More about the lender's profile and the borrower's profile will be described in greater details in some of the subsequent paragraphs with reference to one or more figures.

In certain embodiments, the method or the system for fulfilling a request for loan of a business entity comprises the process or module (106B) for identifying a first lender's commitment to a portion of the entire loan amount. For example, the first lender may decide not to take on the entire loan amount in the loan request but to take on, for example, 70% of the entire loan amount under certain criteria. In some embodiments, the method or the system for fulfilling a request for loan of a business entity comprises the process or module (108B) for presenting the first lender's offer to the business entity. In some embodiments, the method or the system may also present the first lender's offer together with other information or data to the business entity. For example, the method or the system may also present the terms, conditions, covenants, requirements, or even preferences of the first lender or the information or data about the first lender to the business entity. The business entity may decide whether or not to proceed with the loan with the first lender in certain embodiments.

Figure 2A:
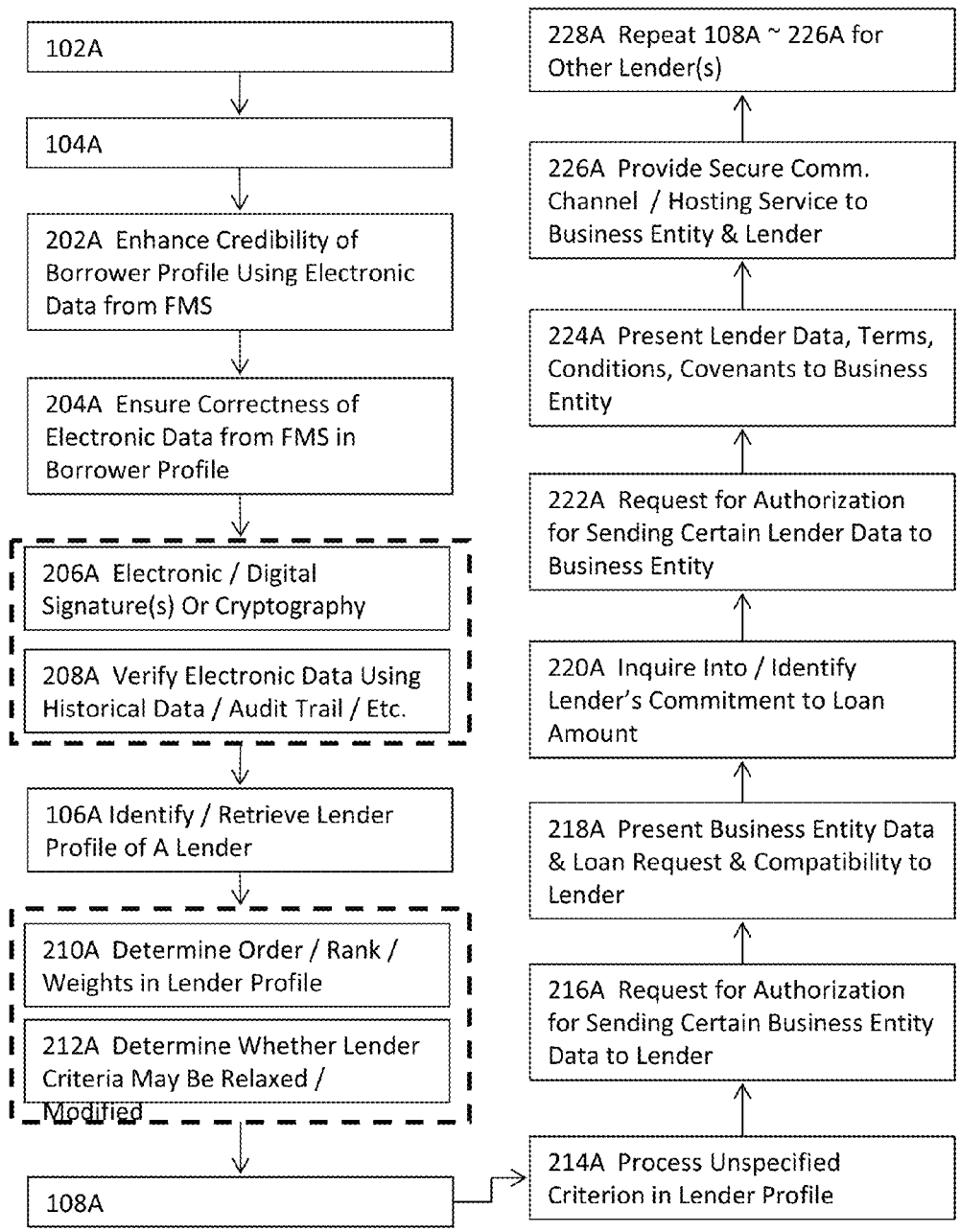
FIG. 2A illustrates a more detailed process flow diagram of a method or system for implementing fulfilling a request for loan of a business entity in certain embodiments.

FIG. 2A illustrates a more detailed process flow diagram of a method or system for implementing fulfilling a request for loan of a business entity in certain embodiments. In one or more embodiments, the method or the system comprises the process or module 102A for identifying or receiving a request for a loan with a loan amount from a business entity. In some embodiments, the method or the system for fulfilling a request for loan of a business entity comprises the process or module (104A) for identifying or creating a borrower's profile of the business entity. At 202A, the method or the system may comprise the process or module for enhancing the credibility of the borrower's profile of the business entity or other data related to or associated with the business entity's request for a loan by using electronic data in certain embodiments.

In certain embodiments, such electronic data comprise data or information from the FMS. At 204A, the method or the system may optionally comprise the process or module for ensuring correctness of the electronic data from, for example but not limited to, the FMS in some embodiments. In some of these embodiments, the method or the system may comprise the process or module (206A) for using an electronic or digital signature or other cryptography techniques to ensure the correctness of the electronic data. For example, the electronic or digital signature affixed with the electronic data may be set to expire to indicate that the electronic data or the data used to generate the electronic data have been mutilated or are inconsistent with other persistent records. In some of these embodiments, the method or the system may comprise the process or module (208A) for verifying the electronic data using other data.

For example, the method or the system may verify the correctness of the electronic data associated with the borrower's profile of the business entity by using, for example but not limited to, data of the business entity's prior tax filings, published records, financial statements, or any other types of data to verify the correctness of the electronic data and thus enhance the credibility of the borrower's profile or any data associated with the borrower's profile of the business entity. In certain embodiments, the method or the system for fulfilling a request for loan of a business entity comprises the process or module (106A) for identifying or retrieving a lender's profile. In some of these embodiments, the method or the system may comprise the process or module 210A for determining or identifying an ordering, a ranking, or weights of one or more criteria in the lender's profile. The ordering, ranking, or weights may be determined automatically by the method or the system, by the lender, or by the method or the system automatically with some input from the lender in certain embodiments.

In some of these embodiments, the method or the system may comprise the process or module 212A for determining whether a compatibility criterion in or associated with the lender's profile may be relaxed or modified. At 108A, the method or the system may comprise the process or module for fulfilling the loan request of the business entity by determining the compatibility between the business entity and the lender based on one or more compatibility criteria in both the borrower's profile of the business entity and the lender's profile in certain embodiments. In certain embodiments, the method or the system may comprise the process or module 214A for processing an unspecified compatibility criterion in or associated with the lender's profile. For example, Lender A may specify a compatibility criterion that requires or prefers the borrower in a certain region of the country, while Lender B may not have such a compatibility criterion in or associated with Lender B's borrower's profile.

The compatibility criterion missing from Lender B's borrower's profile may skew the compatibility results, especially when both Lender A and Lender B are potential financing providers for a business entity. More details about processing an unspecified compatibility criterion in a lender's profile will be described in some of the subsequent paragraphs with reference to one or more figures. In certain embodiments, the method or the system may comprise the process or module 216A for requesting for authorization or approval for sending certain data related to or associated with the business entity to the lender. In certain embodiments, the method or the system may comprise the process or module 218A for presenting the borrower's profile and/or some data associated with or related to the business entity to the lender for review.

In certain embodiments, the method or the system may comprise the process or module 220A for inquiring into or identifying the lender's commitment to the loan amount. For example, the method or the system may inquire into or identify whether the lender decides to take on the entire loan amount or only a fraction of it in certain embodiments. In certain embodiments, the method or the system may comprise the process or module 222A for requesting authorization or approval from the lender for sending some data that are related to or associated with the lender to the business entity that requests for the loan.

In certain embodiments, the method or the system may comprise the process or module 224A for presenting the lender's profile or the data related to or associated with the lender to the business entity for review and consideration. In certain embodiments, the method or the system may optionally comprise the process or module 226A for providing a communication channel for the lender and the business entity to communicate or a hosting service for the lender and the business entity to exchange data or information. In certain embodiments, the communication channel comprises a secure communication channel. In some embodiments, the hosting service utilizes various encryption techniques to ensure the security of the data or information being exchanged between the lender and the business entity.

In certain embodiments, the method or the system may comprise the process or module 228A for repeating the processes or modules 108A through 226A for one or more additional lenders.

Figure 2B:
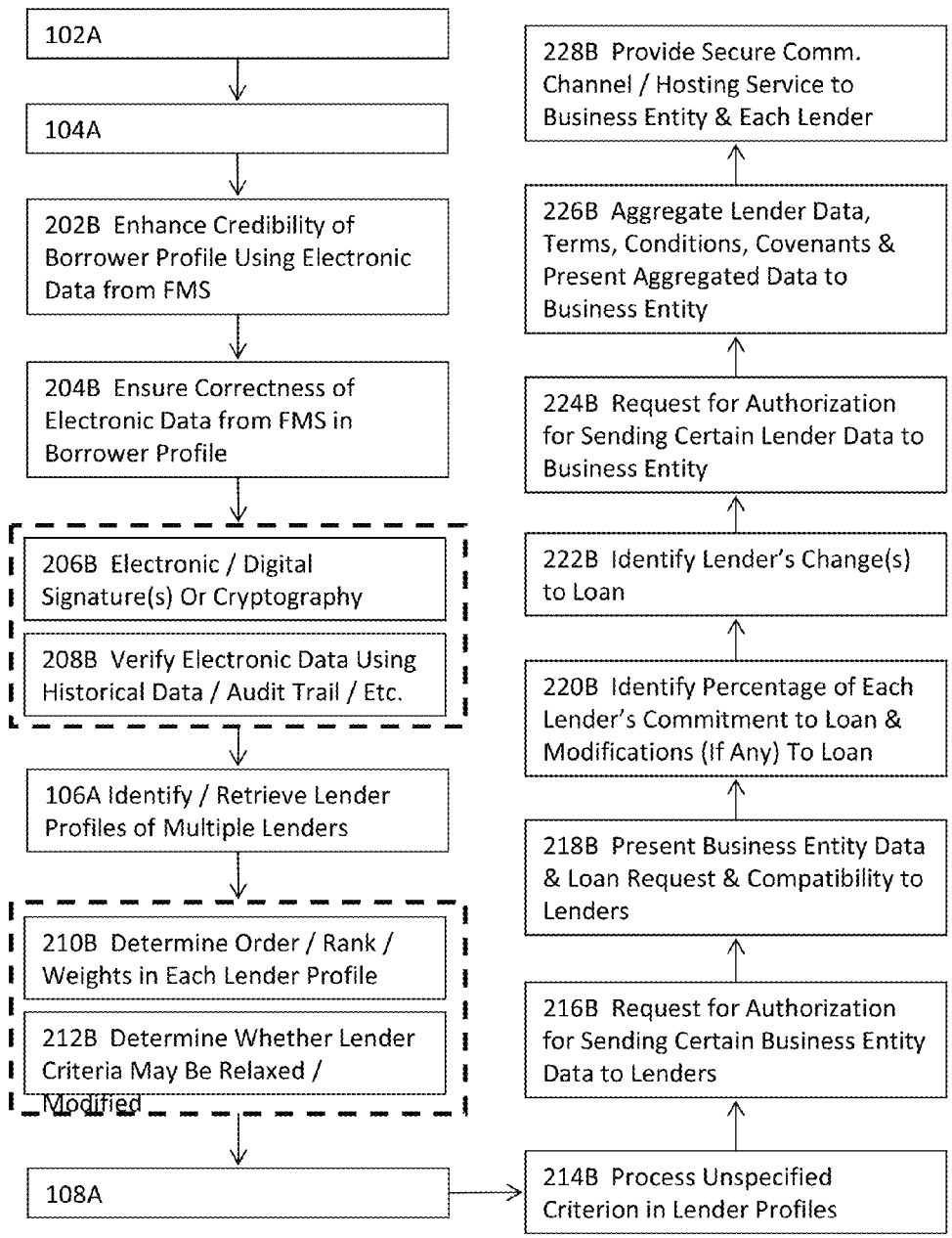
FIG. 2B illustrates a more detailed process flow diagram of a method or system for implementing fulfilling a request for loan of a business entity in certain embodiments.

FIG. 2B illustrates a more detailed process flow diagram of a method or system for implementing fulfilling a request for loan of a business entity in certain embodiments. In one or more embodiments, the method or the system comprises the process or module 102A for identifying or receiving a request for a loan with a loan amount from a business entity. In certain embodiments, the method or the system for fulfilling a request for loan of a business entity comprises the process or module (104A) for identifying or creating a borrower's profile of the business entity. At 202B, the method or the system may comprise the process or module for enhancing the credibility of the borrower's profile of the business entity or other data related to or associated with the business entity's request for a loan by using electronic data in certain embodiments.

In certain embodiments, such electronic data comprise data or information from the financial management system (FMS). At 204B, the method or the system may optionally comprise the process or module for ensuring correctness of the electronic data from, for example but not limited to, the FMS in some embodiments. In some of these embodiments, the method or the system may comprise the process or module (206B) for using an electronic or digital signature or other cryptography techniques to ensure the correctness of the electronic data. In some of these embodiments, the method or the system may comprise the process or module (208B) for verifying the electronic data using other data in a substantially similar as that described in 208A.

In certain embodiments, the method or the system for fulfilling a request for loan of a business entity comprises the process or module (106A) for identifying or retrieving a lender's profile for each of a plurality of lenders. In some of these embodiments, the method or the system may comprise the process or module 210B for determining or identifying an ordering, a ranking, or weights of one or more criteria in the respective lender's profile. The ordering, ranking, or weights may be determined automatically by the method or the system, by the lender, or by the method or the system automatically with some input from the lender in certain embodiments.

In some of these embodiments, the method or the system may comprise the process or module 212B for determining whether a compatibility criterion in or associated with the lender's profile may be relaxed or modified. At 108A, the method or the system may comprise the process or module for fulfilling the loan request of the business entity by determining the respective compatibility between the business entity and each of the plurality of lenders based on one or more compatibility criteria in both the borrower's profile of the business entity and the lender's profile in certain embodiments. In certain embodiments, the method or the system may comprise the process or module 214B for processing an unspecified compatibility criterion in or associated with the lender's profile in a substantially similar manner as those described with reference to 214A.

In some embodiments, the method or the system may comprise the process or module 216B for requesting for authorization or approval for sending certain data related to or associated with the business entity to the lender. In some embodiments, the method or the system may comprise the process or module 218B for presenting the borrower's profile and/or some data associated with or related to the business entity to the plurality of lenders for review. In certain embodiments, the method or the system may comprise the process or module 220B for inquiring into or identifying the lender's commitment from at least some of the plurality of lenders to the loan amount. In some embodiments, the method or the system may determine the respective lender's commitment by equally splitting the entire loan amount by the number of lenders that are willing to deal with the business entity on the loan request (hereinafter participating lenders or a participating lender.)

In some embodiments, the method or the system may identify the respective lender's commitment from each of the participating lenders. In some embodiments where the participating lenders commit more than or less than the entire loan amount, the method or the system ask one or more participating lenders to modify their respective portions. In some embodiments, the method or the system may present the respective lender's commitment from each of the participating lenders to the business entity without change even though the sum of the lender's commitment from all participating lenders is more than or less than the loan amount requested for. In certain embodiments, the method or the system may comprise the process or module for identifying one or more changes made by the respective lender(s) to the loan in a substantially similar manner as that described with reference to FIG. 2A.

In certain embodiments, the method or the system may comprise the process or module 224B for requesting authorization or approval from each of the participating lenders for sending some data that are related to or associated with the respective lender to the business entity that requests for the loan. In some embodiments, the method or the system may comprise the process or module 226B for aggregating, into aggregated data, the respective data, terms, conditions, covenants, lender's profile, or any other data or information related to or associated with the respective lender's response to the request for a loan and presenting the aggregated data to the business entity. In certain embodiments, the method or the system may optionally comprise the process or module 228B for providing a communication channel for each of the participating lenders and the business entity to communicate or a hosting service for the lender and the business entity to exchange data or information. In certain embodiments, the communication channel comprises a secure communication channel. In some embodiments, the hosting service utilizes various encryption techniques to ensure the security of the data or information being exchanged between the participating lenders and the business entity.

Figure 2C:
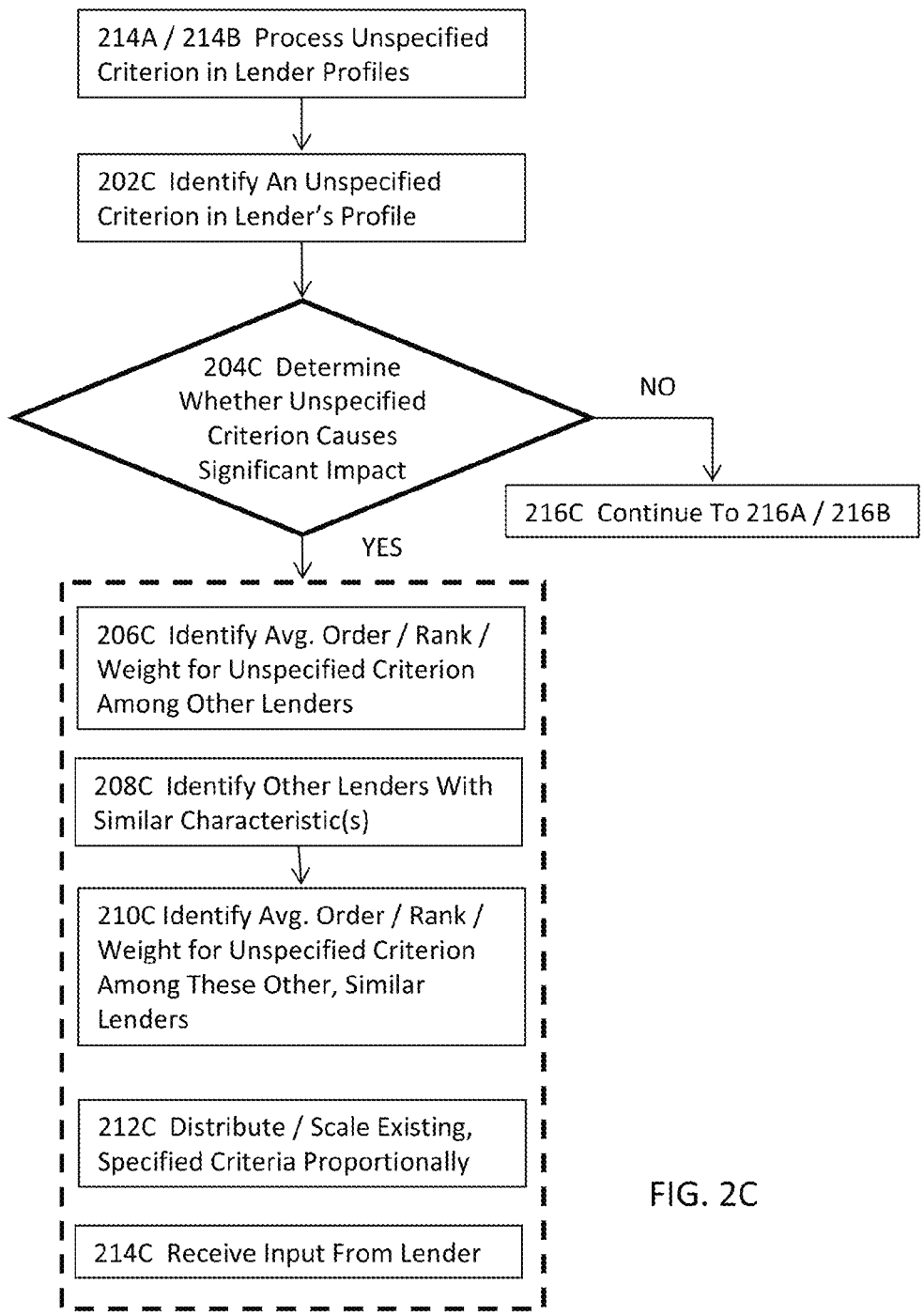
FIG. 2C illustrates a high level flow diagram for the process or module for processing an unspecified compatibility criterion in or associated with a lender's profile in certain embodiments.

FIG. 2C illustrates a high level flow diagram for the process or module for processing an unspecified compatibility criterion in or associated with a lender's profile in certain embodiments. In certain embodiments, the process or module for processing an unspecified compatibility criterion comprises the process or module 202C for identifying an unspecified criterion in or associated with a lender's profile. In certain embodiments, an unspecified compatibility criterion comprises a criterion that is specified in or associated with one lender's profile but is not in or associated with another lender's profile. In some embodiments, the process or module for processing an unspecified compatibility criterion comprises the process or module 204C for determining whether the unspecified compatibility criterion may cause a significant in the determination of compatibility between the lender and the business entity.

For example, in certain embodiments where the compatibility comprises a numeric compatible score, a compatibility criterion that has been shown not to affect the final compatibility score much may be determined not to cause significant impact even if the lender's profile under consideration does not include or is not associated with such a compatibility criterion. In certain embodiments where the method or the system determines that the unspecified criterion may not cause significant impact on the final determination of the compatibility between the business entity and the lender, the method or the system may proceed to 216C to continue the process of 216A or 216B. In certain embodiments where the method or the system determines that the unspecified compatibility criterion may cause a significant impact on the final determination of compatibility, the method or the system may comprise the process or module 206C for identifying an average order, an average rank, or an average weight for the unspecified criterion among other lenders that have specified the same compatibility criterion in or associate it with their respective lender's profile In some embodiments, the method or the system may comprise the process or module 208C for identifying one or more other lenders having similar characteristics as the lender under consideration and the process or module 210C for identifying the average of the order(s), the rank(s), or the weight(s) of these similar lenders and for assigning the average to the compatibility criterion. The method or the system may then include the compatibility criterion in or associate the compatibility criterion with the lender's profile. The lender may be consider to exhibit similar characteristics as other lenders if, for example, these lenders have similar business practice, policy, requirements, etc.

For example, if the method or the system analyzes some historical records and identifies lenders A, B, and C have similar business practice as lender D that is currently under consideration, and lenders A, B, and C previously had respective numeric weights of 1, 1, and 2.5 for a compatibility criterion that is not specified in or associated with lender D's profile, the method or the system may assign the average of 1.5 for the compatibility criterion and associate the average with or include the average in lender D's profile. In the alternative, the method or the system may comprise the process or module for distributing or scaling the existing, specified criteria in or associated with the lender's profile in certain embodiments. For example, if the total numeric weights of all compatibility criteria is 10 with six criteria, and if the lender only specifies three of the six criteria with the respective numeric weights of 1, 2, and 1. The method or the system may then scale the three existing criteria to 2, 4, and 2, respectively while ignoring the other three unspecified compatibility criteria in these embodiments. In the alternative, the method or the system may further prompt the lender for input for the unspecified compatibility criterion.

Figure 3:
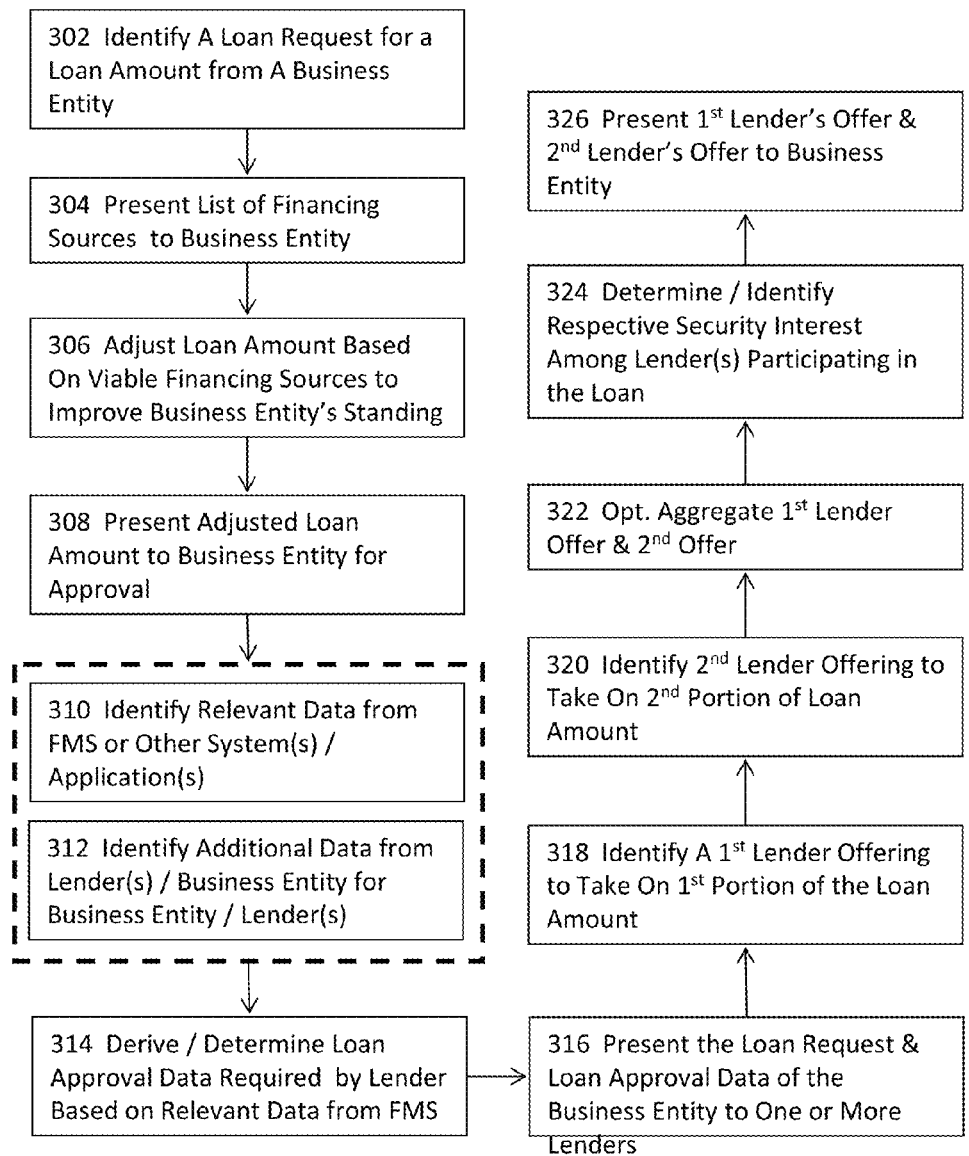
FIG. 3 illustrates a more detailed high level flow diagram of a method or system for implementing fulfilling a request for loan of a business entity illustrated in FIG. 1B in certain embodiments.

FIG. 3 illustrates a more detailed high level flow diagram of a method or system for fulfilling a request for loan of a business entity illustrated in FIG. 1B in some embodiments. In one or more embodiments, the method or the system for fulfilling a request for loan of a business entity may comprise the process or module (302) for identifying a request for a loan amount from a business entity. For example, the method residing on an intermediate computing node may identify a request for loan from a computing system residing in the premise of the business entity. In certain embodiments, the method or the system for fulfilling a request for loan of a business entity may comprise the process or module (304) for presenting a list of financing sources to the business entity. More details about the list of financing sources will be described in some of the subsequent paragraphs with reference to FIG. 4. The business entity may then review the presented list of financing sources.

In certain embodiments, the method or the system for fulfilling a request for loan of a business entity may comprise the process or module (306) for identifying one or more viable financing sources among the list of financing sources by analyzing some financial data of the business entity. The method or the system may further comprise the process or module (306) for adjusting the loan amount that the business entity initially specified in the request based at least in part upon the one or more viable financing sources in certain embodiments. An advantage of such an adjustment of the loan amount is that the business entity's standing will be improved due to the improved loan-to-value (LTV) ratio or the improved debt service coverage ratio (DSCR) because of the reduced loan amount.

In certain embodiments, the method or the system for fulfilling a request for loan of a business entity may comprise the process or module (308) for presenting the adjusted loan amount together with some other data or information to the business entity for review, approval, or modification. For example, if the business entity initially sought a seven million dollars financing in its request, and if the method or the system determines that the business entity may qualify for a small business loan for five million dollars from the 504 Fixed Asset Financing Program (hereinafter 504 loan) of the U.S. Small Business Administration, upon the approval of the business entity, the method or the system may reduce the initial loan amount from seven million dollars to two million dollars while preparing the business entity for applying for the 504 loan.

In certain embodiments, the method or the system for fulfilling a request for loan of a business entity may comprise the process or module for identifying relevant (310) or additional data (312) from, for example, the FMS or other systems or applications where the method or the system may further derive or determine loan approval data that are required by the lender's loan process by using these relevant or additional data at 314. More details about the relevant or additional data will be described in some of the subsequent paragraphs with reference to FIG. 4B. In some embodiments, the method or the system for fulfilling a request for loan of a business entity may comprise the process or module (316) for presenting the loan request and the loan approval data to one or more potential lenders.

In some embodiments, the method or the system for fulfilling a request for loan of a business entity may comprise the process or module (318) for identifying a first lender that may be interested to take on a first portion of the entire loan amount. For example, upon review of borrower A's loan application and other loan approval data, lender B may be interested to take on, for example, 70% of the entire loan amount, and the method or the system may so identify. In some embodiments, the method or the system for fulfilling a request for loan of a business entity may comprise the process or module (320) for identifying a second lender that may be interested to take on a second portion of the entire loan amount. For example, after identifying that lender A may be interested in taking on 70% of borrower Z's entire loan amount, the method or the system may further identify lender B that may be interested in taking on 40% or 20% of borrower Z's entire loan amount.

In certain embodiments, the method or the system for fulfilling a request for loan of a business entity may comprise the process or module (322) for aggregating the offers from the first lender and the second lender into aggregated data and presenting the aggregated data to the business entity. In certain embodiments, the method or the system may present the aggregated data on a dashboard for the business entity to review. An exemplary implementation of the dashboard in the method or the system is provided in FIG. 16B and will be described in some of the subsequent paragraphs. In certain embodiments, the method or the system for fulfilling a request for loan of a business entity may comprise the process or module (324) for determining the respective security interests among potential lenders that may be interested in participating in the loan.

In certain embodiments where the business offers collateral for backing up the loan, the method or the system may determine the first lien, the second lien, etc. for the potential, participating lenders based on the first-in-time principle. For example, if lender A first indicates its interest in taking on a portion of the loan amount, and lender B comes after lender A, the method or the system may suggest that lender A will be holding a first lien on the collateral such that lender A will be paid first with the proceeds from the sale of the collateral if the borrower defaults on the loan. Other means for determining the security interest among multiple participating lenders may also be utilized and shall not be considered as limiting the scope of various embodiments or the scope of the claims unless otherwise so specified. In certain embodiments, the method or the system for fulfilling a request for loan of a business entity may comprise the process or module (326) for presenting various data or information about the potential participating lenders to the business entity. In some embodiments, the various data or information may comprise the lender's profiles, terms, conditions, covenants, or preferences of respective these potential participating lenders or any other information or data about these potential participating lenders.

Figure 4A:
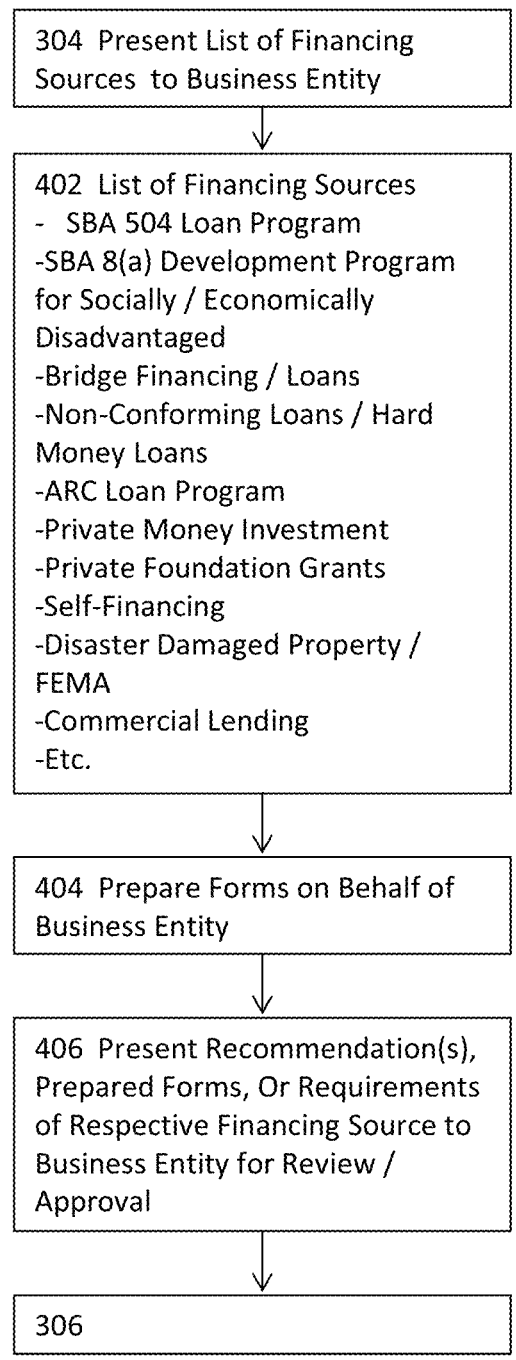
FIG. 4A illustrates more details about the process or module for presenting a list of financing sources to the business entity in certain embodiments.

FIG. 4A illustrates more details about the process or module for presenting a list of financing sources to the business entity in some embodiments. In some embodiments, the list of financing sources may comprise the 504 loan program of the U.S. Small Business Administration (hereinafter SBA), the 8(a) Development Program for the socially or economically disadvantaged from the SBA, various bridge financing or bridge loans if the business entity reasonably expects some inflow of cash, some commercial non-conforming loans (e.g., hard money loans), the ARC (America's Recovery Capital) loan program, private money investment, grants from private foundations, self-financing by the owner(s) of the business entity, grants from Federal Emergency Management Agency (FEMA), commercial lending, etc. It shall be noted that the list 402 provides some exemplary financing options or sources but does not intend to be exhaustive and should not be interpreted as such.

In certain embodiments, the process or module for presenting a list of financing sources may further comprise the process or module (404) for preparing various forms or applications on behalf of the business entity for one or more viable financing options from the list of financing sources. In certain embodiments, the process or module for presenting a list of financing sources may further comprise the process or module (406) for presenting a recommendation to the business entity for review, approval, or modification. In certain embodiments, the method or the system may also present the prepared forms or applications or requirements or information of the respective viable financing sources to the business entity at 406. The process or module may then proceed to 306 to continue the processing in certain embodiments.

Figure 4B:
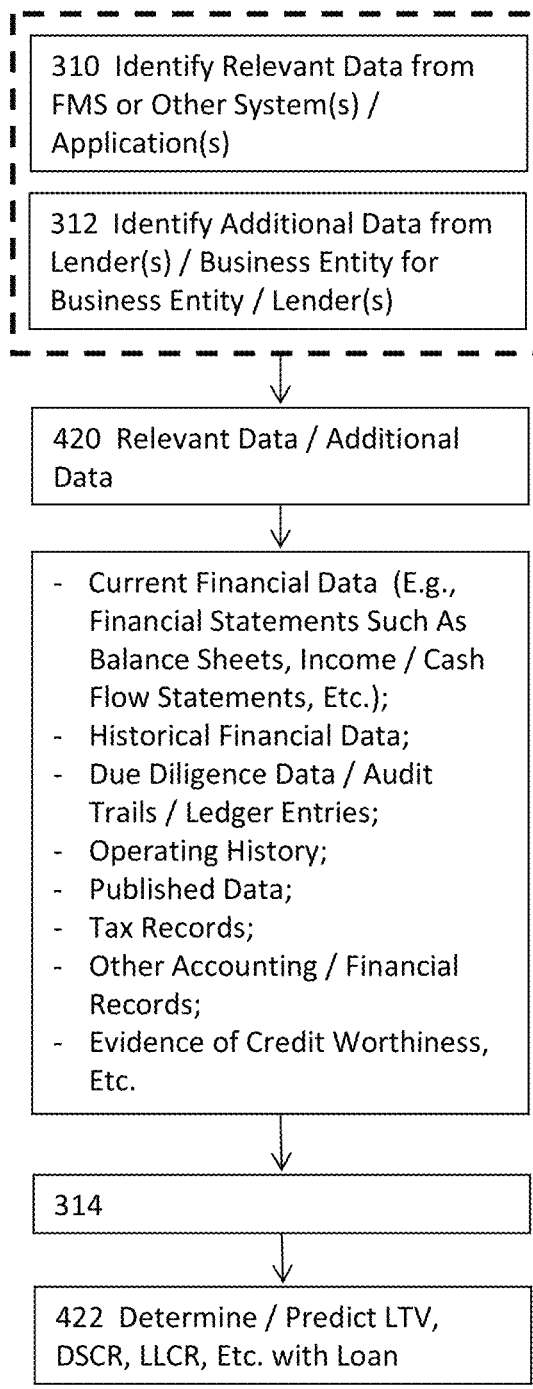

FIG. 4B illustrates more details about the process or module for identifying relevant data or additional data in some embodiments. In certain embodiments, the relevant data or additional data (420) may comprise current financial data, historical financial data, due diligence data, audit trails, accounting ledger entries, operating history, publicly published data, prior tax records and tax filing records, financial statements such as balance sheets, income statement, cash flow statement, etc., other accounting or financial records, or evidence of credit worthiness In one or more embodiments, the process or module for identifying relevant or additional data may further comprise the process or module (422) for determining or predicting various other data if the loan is granted. For example, the method or the system may determine or predict the loan-to-value ratio(s) (LTV), the debt service coverage ratio(s) (DSCR), the loan life coverage ratio(s) (LLCR), etc. while assuming the loan is granted to the business entity. A loan-to-value ratio may be defined as the ratio between the loan amount and the value of the property being financed and usually represents the maximum amount that a specific lender will lend a borrowing business entity. Each lender may establish its own LTV. For example, a business entity may seek financing to purchase an existing or build a new building. The LTV ratio is then the ratio between the loan amount sought and the value of the building determined by, for example, the appraisal value of the building. Another way to determine the LTV is to obtain the liquidated value of the property (e.g., the price at which the property could be sold within a short period of time, such as 90 days), and then subtract any outstanding debt (e.g., existing loans and tax liens, etc.) related to the property to determine the value of the property, and then divide the requested loan amount by the value of the property. The LTV ratio for commercial properties typically goes from 55% to 70% and usually does not exceed 65% for bridge loans or bridge financing. The DSCR may be considered as the ratio of cash available to the required loan payments or the ratio of cash available for debt servicing to interest, principal, and lease payment. The DSCR for a business entity may be determined by first adding the business entity's annual net income, the amortization and depreciation, interest expense, and other non-cash and discretionary items (e.g., non-contractual management bonuses) to determine the first sum representing cash or net operating income available for debt servicing. The DSCR calculation then determines the business entity's annual debt service (e.g., vacancy amounts, operating expenses, principal payment, interest payment, lease payment, etc.) and then dividing the net operating income by the annual debt service. Different lenders may establish different minimum DSCRs. A typical lender may require the DSCR to fall within 1.1 and 1.4 and may require the borrowing business entity to maintain the DSCR during the term of the loan or during a pre-determined period of time. Certain lenders may even require that various requirements for the DSCR be a loan condition or a loan covenant, and the breach of these DSCR conditions or covenants constitutes an act of default. An LLCR is defined as the net present value of cash flow available for debt service divided by the outstanding debt of the borrowing business entity in the period. In some cases, the net present value is measured up until the maturity of the debt tranche. A lender may use the LLCR to estimate the credit quality of the borrowing business entity from the lender's perspective and may require different LLCR ranging from, for example, 1.25 to 2.5.

Figure 5:
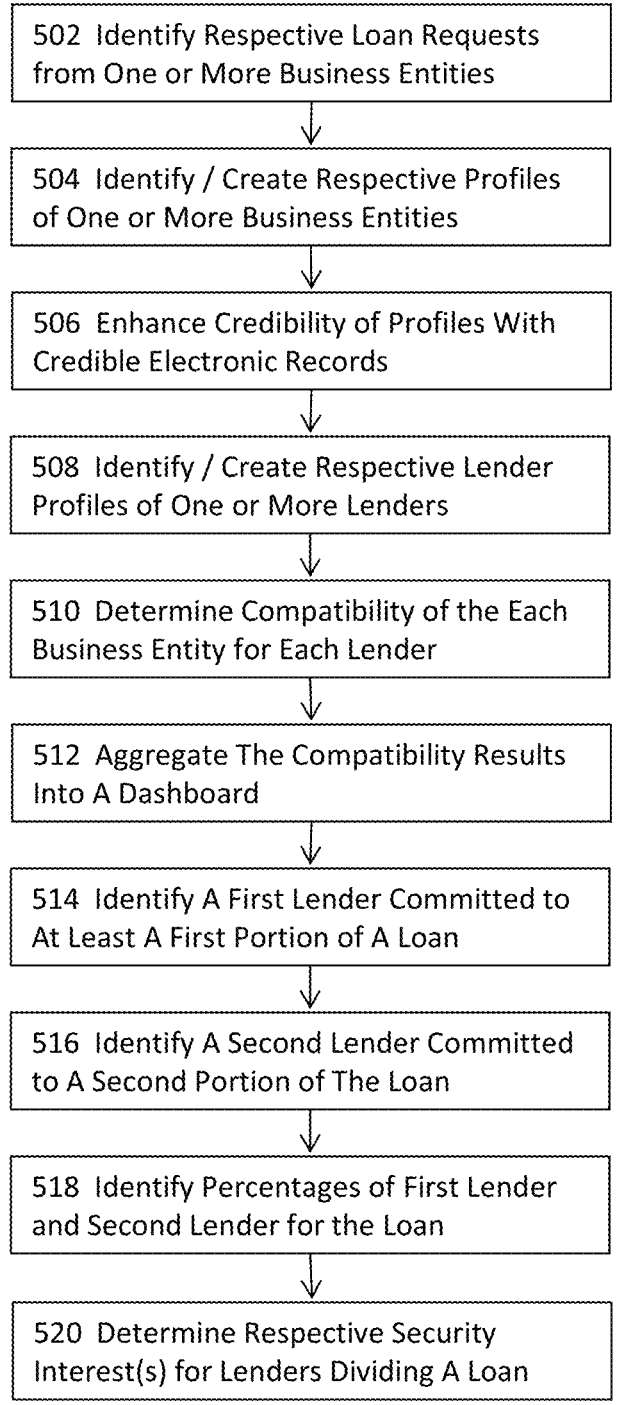
FIG. 5 illustrates a high level flow diagram for a method or a system for fulfilling a loan request by a business entity in certain embodiments.

FIG. 5 illustrates a high level flow diagram for a method or a system for fulfilling a loan request by a business entity in certain embodiments. In one or more embodiments, the method or the system for fulfilling a loan request by a business entity may comprise the process or module (502) for identifying, at an intermediate system situated between the lenders and the borrowing business entities, respective loan requests from one or more business entities. In these embodiments, the intermediate system hosting various processes or modules disclosed herein may identify one or more requests for loans from one or more business entities seeking financing. In certain embodiments, the method or the system for fulfilling a loan request by a business entity may comprise the process or module (504) for identifying, creating, or updating respective borrower's profiles of the one or more business entities.

In certain embodiments, a lender's profile may include compatibility criteria associated with one or more loans, data or information about the business entity, or any other data or information that is associated with or related to loans or the business entity seeking financing. More details about the contents of a borrower's profile will be described in some of the subsequent paragraphs with reference to one or more figures. In certain embodiments, the method or the system for fulfilling a loan request by a business entity may comprise the process or module (506) for enhancing credibility of at least one of the borrower's profiles with electronic records from credible sources in a substantially similar manner as described in the preceding paragraphs with reference to FIGS. 2A-B. In certain embodiments, the method or the system for fulfilling a loan request by a business entity may comprise the process or module (508) for identifying, creating, or updating one or more lender profiles of one or more lenders.

In certain embodiments, a lender's profile may include compatibility criteria associated with one or more loans or the lender, data or information about the lender, or any other data or information that is associated with or related to loans or the lender. More details about the contents of a lender's profile will be described in some of the subsequent paragraphs with reference to one or more figures. In certain embodiments, the method or the system for fulfilling a loan request by a business entity may comprise the process or module (510) for determining compatibility of each of the one or more business entities and each of the one or more lenders. In certain embodiments, the method or the system for fulfilling a loan request by a business entity may comprise the process or module (512) for aggregating the compatibility results into a dash board.

In certain embodiments, the process or module 512 aggregates the compatibility results between a borrowing business entity and one or more potential lenders into a dashboard for the borrowing business entity to review. In certain embodiments, the process or module 512 aggregates the compatibility results between a lender and one or more business entities seeking financing into a dashboard for the lender to review. An exemplary dashboard for a lender is illustrated in FIG. 16B which will be described later. In certain embodiments, the method or the system for fulfilling a loan request by a business entity may comprise the process or module (514) for identifying a first lender that indicates its interest or commitment to take on a first portion of a loan. For example, upon reviewing business entity A's loan and related data, lender X may indicate its interest or even commitment to, for example, 60% of the loan amount that business entity A is seeking.

In certain embodiments, the method or the system for fulfilling a loan request by a business entity may comprise the process or module (516) for identifying a second lender that indicates its interest or commitment to take on a second portion of the loan amount. For example, the process or module 516 may identify a second lender that indicates its interest or commitment to take on, for example, 20%, 40%, or 60% of the loan amount that the borrowing business entity is seeking. In certain embodiments, the method or the system for fulfilling a loan request by a business entity may comprise the process or module (518) for identifying percentages of the first lender and the second lender for the loan that the business entity has been seeking. In the previous examples, the process or module 518 may determine to equally divide the loan amount between the first lender and the second lender in certain embodiments.

In certain other embodiments, the process or module 518 may identify the percentages for the best interest of the borrowing business entity. In certain other embodiments, the process or module 518 may identify the percentages for the first lender and the second lender for the best interest of either one of or both the first lender and the second lender. In certain other embodiments, the process or module 518 may identify the percentages for the first and the second lender based on a compromised position that benefits both the lenders and the borrowing business entity. In certain embodiments, the process or module 518 may identify the percentages based on the inputs of the borrowing business entity, one of the lenders, or all participating lenders. In some embodiments, the method or the system for fulfilling a loan request by a business entity may comprise the process or module (520) for determining respective security interest for the lenders that jointly divide up the entire loan amount in a substantially similar manner described in some of the preceding paragraphs with reference to FIG. 3.

Figure 6:
FIG. 6 illustrates exemplary content of a borrower's profile of a business entity that seeks financing by using various processes or modules described in various embodiments.
Figure 6:
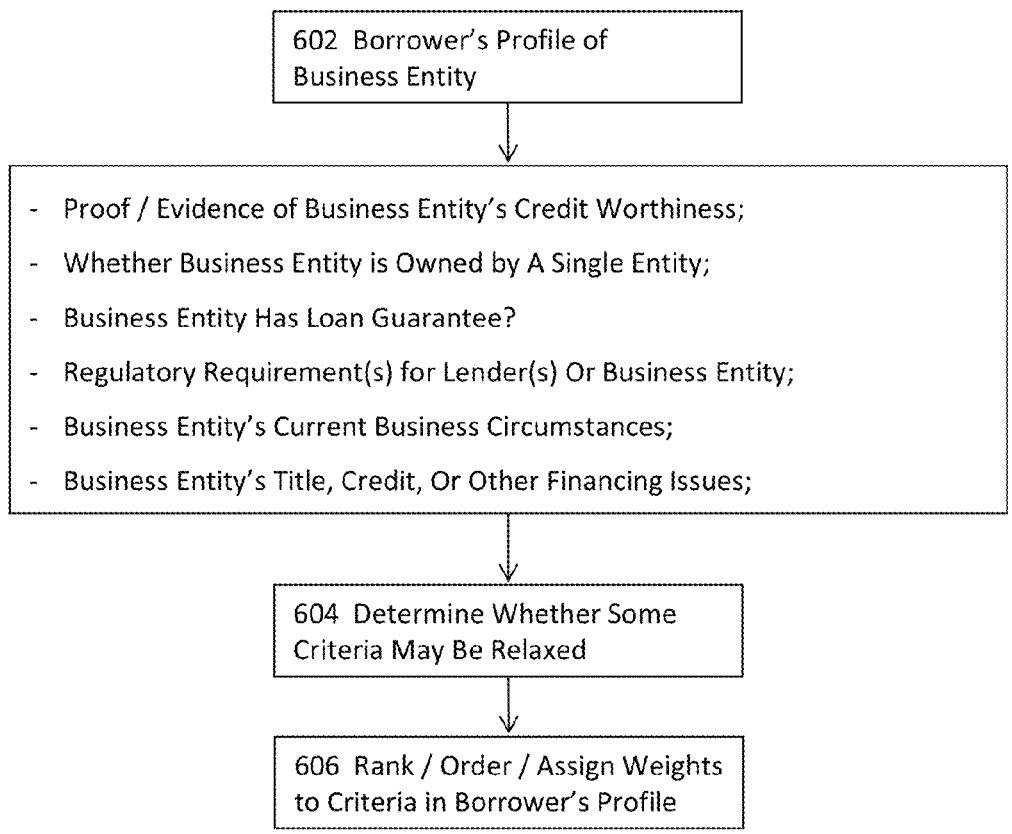

FIG. 6 illustrates some exemplary content of a borrower's profile of a business entity that seeks financing by using various processes or modules described in various embodiments. It shall be noted that the list 602 provides some exemplary types of information or data that may be included in or associated with a borrower's profile but does not intend to be exhaustive and should not be interpreted as such. In certain embodiments, the borrower's profile may include or be associated with an indication of whether the financing will be used for startup funding. Startup companies usually present higher risks with possibly insufficient credit history and thus may have more difficulties in securing a loan. Certain lenders may rely on this information to lower the compatibility by, for example, assigning a lower order, rank, or weight. Certain lenders may rely on this information to decline the request for loan.

In certain embodiments, the borrower's profile may include or be associated with the business entity's financial statements. For example, various processes or module may include or associate the profile with the business entity's income statement, cash flow statement, etc. by pulling or receiving the electronic records of such financial statements from, for example, the FMS. Some processes or modules may even crawl or traverse these electronic records to retrieve certain information (e.g., net operating income, gross or net profit, liabilities, etc.) and use it as a compatibility criterion.

In certain embodiments, the borrower's profile may include or be associated with the business entity's balance sheets (e.g., cash, account receivable, inventory, real estate owned, equipment, prepaid expenses, intangible assets, biological assets, investment accounts, accounts payable (A/P), current tax liability, deferred tax liability, unearned revenue, etc.) at one or multiple points in time. Certain processes or modules may even crawl or traverse these electronic records to retrieve certain information and use it as a compatibility criterion. In certain embodiments, the borrower's profile may include or be associated with the business entity's current tax data, prior tax filings or data, payroll records, etc. from certain credible sources by pulling the electronic records from, for example, the FMS, certain published records, or certain government records.

In one or more embodiments, processes or modules may further utilize these electronic to verify the correctness of the information or data in a profile or other types of data. In one or more embodiments, the borrower's profile may include or be associated with the business entity's operating history including, for example, operating profit for the current or one or more prior years. Certain loan programs have specific requirements on the operating profit. For example, the SBA 504 Loan Program requires that the operating profit be less than five million U.S. dollars in order to qualify for the SBA 54 loan. Certain loan programs may require the borrowing entity to show profitability in at least one of the past number of years (e.g., at least one of the preceding two years for SBA 504 loan.)

In one or more embodiments, the borrower's profile may include or be associated with the business entity's preferred or acceptable terms, conditions, covenants, etc. about the loan. In certain embodiments, the borrower's profile may include or be associated with the business entity's net worth. Certain loan programs place an upper limit on the borrower's net worth. For example, the SBA has a $15 million U.S. dollar limit on a borrower's net worth in order to qualify for the SBA 504 loan. The various processes or modules use such an upper limit as a compatibility criterion to determine, for example, how well the business entity is compatible with the lender.

In certain embodiments, the borrower's profile may include or be associated with the status of the owner of the business entity. The status may comprise, for example, whether the owner is socially or economically disadvantaged, whether the owner is a U.S. citizen or permanent resident, etc. For example the SBA Business Development Program assists in the development of small business owned and operated by individuals who are socially and economically disadvantaged, such as women and minorities, and the SBA 504 loan requires that the owners be U.S. citizens or permanent residents. In one or more embodiments, the borrower's profile may include or be associated with the planned use of loan such as the percentage of business entity's own use of the project funded by the loan.

In certain embodiments, the borrower's profile may include or be associated with location of the business entity. For example, certain loan programs or lenders require or prefer that the business entity be located in the United States instead of a foreign country or in a particular region (e.g., in the Western States.) In certain embodiments, the borrower's profile may include or be associated with whether the business entity is a non-profit organization. For example, the SBA 504 loan program disqualifies any business entities that are non-profit organizations. In certain embodiments, the borrower's profile may include or be associated with any proof or evidence that the business entity's goal(s) may be achieved by the loan.

In one or more embodiments, the borrower's profile may include or be associated with whether the business entity is in the loan business, the loan packaging business, or the political or lobbying business. For example, the SBA 504 loan program disqualifies any business entities in any of the aforementioned businesses. In certain embodiments, the borrower's profile may include or be associated with whether the business entity imposes any restrictions on patronage. For example, U.S. federal loan programs may disqualify a business entity if it is determined that the business entity imposes any such restrictions on patronage or provides prurient sexual material in its business. In one or more embodiments, the borrower's profile may include or be associated with the business entity's prior financial history. For example, whether the business entity has defaulted on a loan, whether there existed any past delinquency, poor viability, or arrears, etc.

In certain embodiments, the borrower's profile may include or be associated with whether the business entity engages in a speculative business. In certain embodiments, the borrower's profile may include or be associated with whether the loan is for rebuilding disaster damaged real property. For example, the Federal Emergency Management Agency (FEMA) provides assistance loans for damages caused by disasters. In certain embodiments, the borrower's profile may include or be associated with whether the business entity reasonably expects inflow of cash. For example, if the business entity reasonably expects inflow of cash from, for example, sale of assets, the business entity may pursue certain bridge loans or bridge financing. In certain embodiments, the borrower's profile may include or be associated with the business entity's own contribution to financing. For example, the SBA 504 loan program requires that the borrowing business entity contributes 10-20% of the loan amount.

In one or more embodiments, the borrower's profile may include or be associated with whether the business entity or the owner has any protective equity existing in certain property. Many lenders use the protective equity to determine the maximum amount for the loan. In certain embodiments, the borrower's profile may include or be associated with whether the business entity offers any collateral and the value of the collateral. In certain embodiments, the borrower's profile may include or be associated with whether the business entity was previously declined for loans or whether the business entity is or was unqualified for financing. In certain embodiments, the borrower's profile may include or be associated with whether there is an on-going bankruptcy or foreclosure proceeding or any adverse credit history associated with the business entity.

In one or more embodiments, the borrower's profile may include or be associated with the business entity's DSCR, LTV, LLCR, etc. In certain embodiments, the borrower's profile may include or be associated with any proof or evidence of business entity's credit worthiness. In certain embodiments, the borrower's profile may include or be associated with whether the business entity is owned by a single entity such as a bankruptcy remote which allows the creditor to foreclose even if the borrowing business entity goes into bankruptcy. In certain embodiments, the borrower's profile may include or be associated with whether the business entity presents any loan guarantees such as personal guarantee from the owners, from other business entities, or from government agencies.

In one or more embodiments, the borrower's profile may include or be associated with whether there are any regulatory requirements for the lenders or for the business entities. For example, a credit union is usually disallowed to engage in commercial lending with minor restrictions such as lending more than 80% of the value of the real property being financed. In one or more embodiments, the borrower's profile may include or be associated with the current business circumstances of the business entity such as whether the business is stable or whether the business entity is profitable. In certain embodiments, the borrower's profile may include or be associated with whether there exist any issues with the business entity's title, credit, or other financing issues. In certain embodiments, some processes or modules may comprise the process or module for determining whether some of the compatibility criteria may be relaxed at 604. In certain embodiments, some processes or modules may comprise the process or module for ranking, ordering, or assigning weights to the compatibility criteria included in or associated with the borrower's profile at 606.

Figure 7:
FIG. 7 illustrates exemplary content of a lender's profile by using various processes or modules described in various embodiments.
Figure 7:
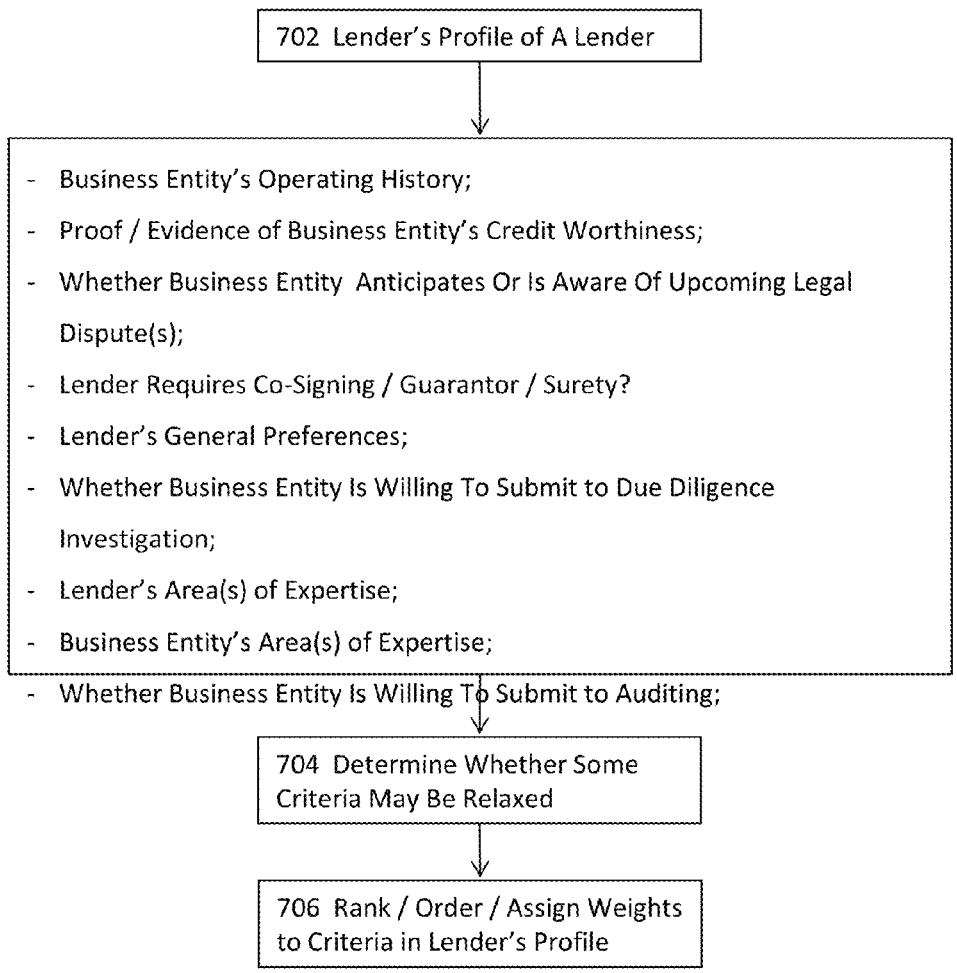

FIG. 7 illustrates some exemplary content of a lender's profile by using various processes or modules described in various embodiments. In certain embodiments, the lender's profile may include or be associated with preferred or acceptable ranges for interest rate, terms, loan amount, loan criteria, etc. of the lender. In certain embodiments, the lender's profile may include or be associated with the fees, costs, expenses, points, etc. that are required or preferred by the lender. In certain embodiments, the lender's profile may include or be associated with whether the lender requires or prefers any equity in the business entity or the property or project being financed. For example, a lender may require or prefer 15% of shares of the business entity in exchange for a loan of $10 million U.S. dollars.

In one or more embodiments, the lender's profile may include or be associated with the lender's preferred or acceptable credit rating, net worth, LTV, DSCR, LLCR, value of the collateral, etc. of the business entity seeking financing from the lender. In one or more embodiments, the lender's profile may include or be associated with the business entity's prior adverse credit history. In one or more embodiments, the lender's profile may include or be associated with the lender's underwriting or audit requirements, conditions, covenants, etc. In certain embodiments, the lender's profile may include or be associated with whether the business entity reasonably expects inflow of cash.

In certain embodiments, the lender's profile may include or be associated with any regulatory requirements on the lender. In certain embodiments, the lender's profile may include or be associated with whether there is any loan guarantee backing up the loan. In certain embodiments, the lender's profile may include or be associated with the business entity's financial statements, balance sheets for one or multiple points in time, current tax liability, prior tax filings or records, accounting records, payroll records, or any other records related to the business entity. In certain embodiments, the lender's profile may include or be associated with the operating history of the business entity.

In certain embodiments, the lender's profile may include or be associated with any proof or evidence of the business entity's credit worthiness. In certain embodiments, the lender's profile may include or be associated with whether the business anticipates or is aware of any upcoming legal disputes involving the business entity. In one or more embodiments, the lender's profile may include or be associated with whether there is a requirement for co-signing, guarantor, or surety. In certain embodiments, the lender's profile may include or be associated with any general preferences of the lender.

In one or more embodiments, the lender's profile may include or be associated with whether the borrowing business entity is willing to submit to due diligence investigation or any financial audits by internal or external auditors. In certain embodiments, the lender's profile may include or be associated with the lender's area(s) of expertise or business or the business entities area(s) of expertise of business. In certain embodiments, certain processes or modules may comprise the process or module for determining whether some of the compatibility criteria may be relaxed at 704. In certain embodiments, some processes or modules may comprise the process or module for ranking, ordering, or assigning weights to the compatibility criteria included in or associated with the lender's profile at 706.

Figure 8A:
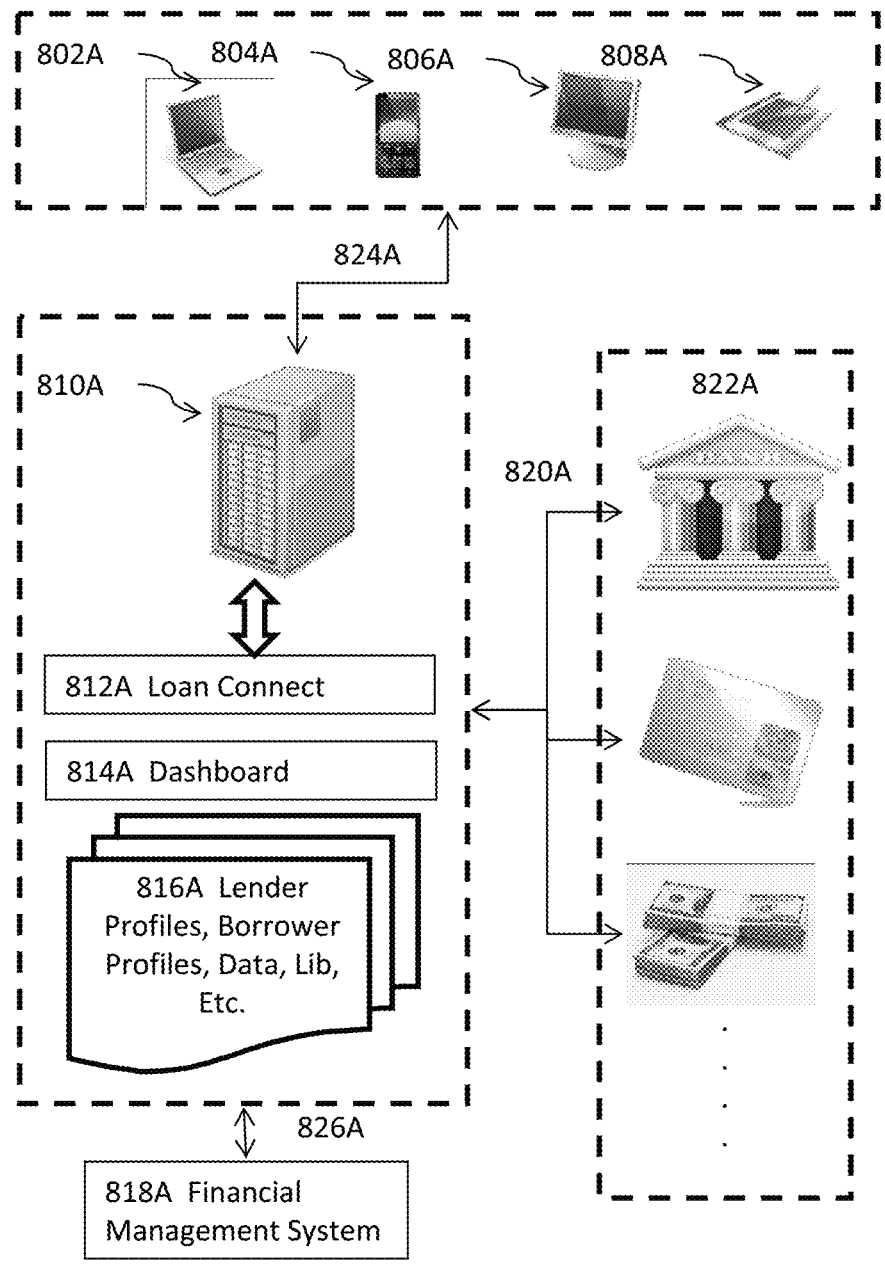
FIG. 8A illustrates an exemplary configuration of multiple systems interacting with each other to utilize various processes or modules described herein in certain embodiments.

FIG. 8A illustrates an exemplary configuration of multiple systems interacting with each other to utilize various processes or modules described herein in certain embodiments. FIG. 8A illustrates one or more business entities using various types of computing devices such as a laptop computer 802A, a mobile phone 804A, a desktop computer 806A, or a tablet 808A to interact with, via a first network 824A, an intermediate system 810A hosting various applications or resources such as various processes or modules described in the preceding paragraphs although not all processes or modules described herein need to be implemented on the same computing system.

In certain embodiments, the intermediate system 810A comprises or is configured or implemented to interact with the loan connect 812 which comprises various processes or modules disclosed herein and a dashboard process or module 814A for presenting various data or information to the lenders or the borrowing business entities. In certain embodiments, the intermediate system 810A comprises or is configured or implemented to interact with various data structures 816A such as a database system including one or more database tables for data or information such as the lender's profiles, the borrower's profiles, various types of data or information, libraries, etc. for the implementation or execution of various processes or modules.

In certain embodiments, the intermediate system 810A comprises or is configured or implemented to interact with the FMS 818A such that the intermediate system 810A may pull or received from the FMS various types of information or data. In some embodiments, the intermediate system 810A is further configured or implemented to interact with one or more remote computing systems 822A of various lenders via a second network 820A.

Figure 8B:
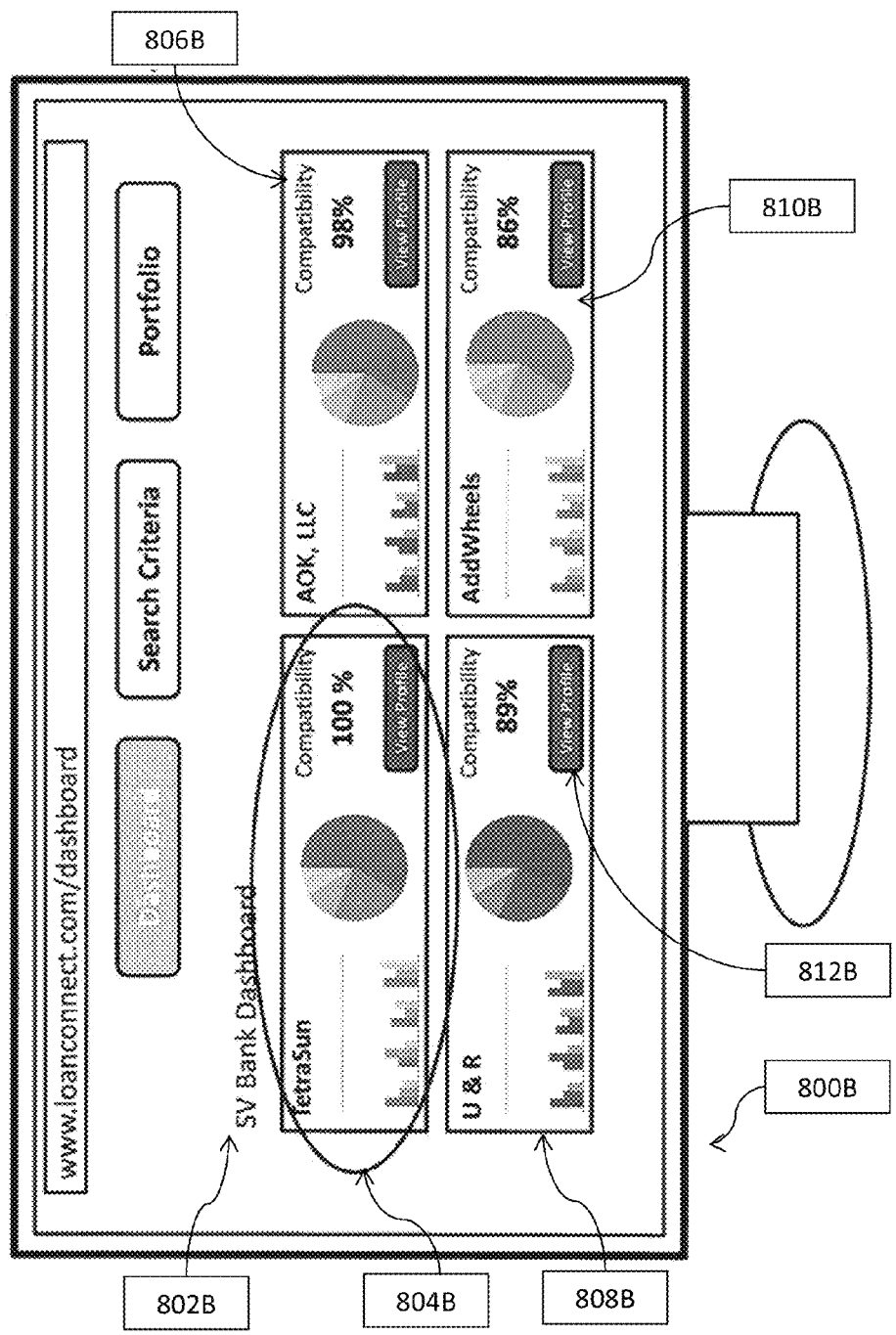
FIG. 8B illustrates an exemplary implementation of a dashboard for presenting the compatibility results together with various information or data to the lenders or borrowing business entities in certain embodiments.

FIG. 8B illustrates an exemplary implementation of a dashboard for presenting the compatibility results together with various information or data to the lenders or borrowing business entities in certain embodiments. More particularly, FIG. 8B illustrates a dashboard 800B presenting compatibility results of four potential borrowing business entities (804B, 806B, 808B, and 810B) to a lender 802B.

In this exemplary implementation, various methods or systems identify, determine, and prepare the compatibility data for the four fictitious borrowing business entities, TetraSun 804B, AOK, LLC 806B, U & R 808B, and AddWheels 810B, to the fictitious lender SV Bank 802B in the SV Bank dashboard. As it can be seen from this exemplary implementation, the method or the system is showing 100% compatibility for TetraSun, 98% compatibility for AOK, LLC, 89% compatibility for U & R, and 86% compatibility for AddWheels. Within the aggregated form of presentation in the dashboard, the method or the system also provides a "View Profile" link 812B for the lender to review the borrowing business entity's profile. In certain embodiments, the method or the system may further provide additional capability for a reviewing entity to review other related or associated information or data. It shall be noted that although FIG. 8B illustrates a dashboard for presenting data or information to a lender, a dashboard may also be implemented to present data or information to a borrowing business entity.

System Architecture Overview

Figure 9:
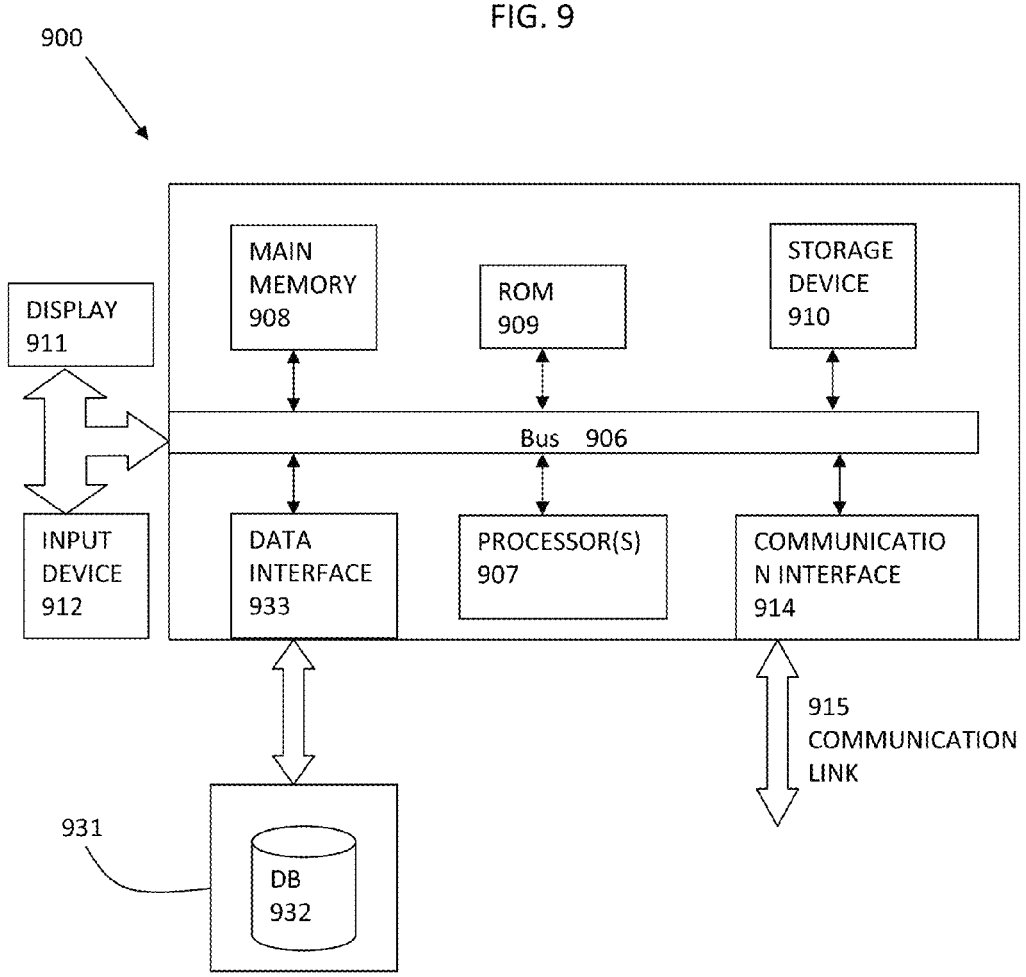
FIG. 9 illustrates a block diagram of an illustrative computing system 900 suitable for implementing various embodiment of the invention

FIG. 9 illustrates a block diagram of components of an illustrative computing system 900 suitable for implementing various embodiment of the invention. For example, the exemplary computing system 900 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (not shown).

According to one embodiment of the invention, computer system 900 performs specific operations by one or more processors or processor cores 907 executing one or more sequences of one or more instructions contained in system memory 908. Such instructions may be read into system memory 908 from another computer readable/usable storage medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in certain embodiments, the one or more processors or processor cores 907 may be used to perform various actions such as various actions, processes, or modules involving determining, analyzing, performing actions, etc. In certain embodiments, at least one of the one or more processors or processor cores 907 has the multithreading capability.

In one embodiment, the term "logic" shall mean any combination of software or hardware that is used to implement all or part of the invention. In the single embodiment or in certain embodiments, the one or more processors or processor cores 907 may be used to perform various acts such as various acts involving determining, analyzing, performing actions, etc. In certain embodiments, at least one of the one or more processors or processor cores 907 has the multithreading capability to execute a plurality of threads to perform various tasks as described in the preceding sections.

Various actions as described in the preceding paragraphs may be performed by using one or more processors, one or more processor cores, or combination thereof 907. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. In an embodiment, the computer system 900 operates in conjunction with a data storage system 931, e.g., a data storage system 931 that contains a database 932 that is readily accessible by the computer system 900. The computer system 900 communicates with the data storage system 931 through a data interface 933. A data interface 933, which is coupled to the bus 906, transmits and receives electrical, electromagnetic or optical signals that include data streams representing various types of signal information, e.g., instructions, messages and data. In embodiments of the invention, the functions of the data interface 933 may be performed by the communication interface 914.

In the foregoing specification, various embodiments have been described with reference to specific embodiments thereof. The description, figures, and claims, and the drawings are provided as illustrative and enabling examples of how embodiments may be implemented. Notably, the figures and the examples below are not meant to limit the scope of embodiments. Where certain elements of embodiments can be partially or fully implemented using known components (or methods or processes), portions of such known components (or methods or processes) that are necessary for an understanding of embodiments will be described, and the detailed descriptions of other portions of such known components (or methods or processes) will be omitted for ease of explanation and to not obscure embodiments. Further, embodiments encompass present and future known equivalents to the components referred to herein by way of illustration.

It will also be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for fulfilling a request for loan of a business entity, the method comprising:
    a loan connect mechanism coupled to at least one microprocessor of an intermediate computer in communication with a computing device of a business entity via a first computing network and a computer of a lender via a second computing network identifying or receiving a request for a loan for a loan amount from the computing device of the business entity via the first computing network;
    the loan connect mechanism coupled to at least one microprocessor of the intermediate computer identifying or creating a borrower's profile for the business entity based at least in part upon the request;
    the loan connect mechanism coupled to at least one microprocessor of the intermediate computer identifying or receiving a lender's profile by fetching or receiving the lender's profile from the computer of the lender via the second computing network;
    the loan connect mechanism coupled to at least one microprocessor of the intermediate computer and a financial management system receiving electronic data from the financial management system that is utilized by the business entity, the financial management system being linked to at least one financial account of the business entity;
    the loan connect mechanism coupled to at least one microprocessor of the intermediate computer enhancing credibility of the borrower's profile by using at least the electronic data from the financial management system to improve the credibility of the borrower's profile or other data associated with the borrower's profile based at least in part upon the electronic data received from the financial management system; and
    the loan connect mechanism coupled to at least one microprocessor of the intermediate computer identifying a first compatibility criterion of a first type of compatibility at least by receiving or identifying the first compatibility criterion included in or associated with another lender's profile from another computing system of another lender via another computing network, wherein the first type of compatibility is included in, associated with, or specified in the lender's profile that comprises a plurality of compatibility criteria of one or more other compatibility types that are used to determine whether or not the loan is to be granted; and
    the loan connect mechanism coupled to at least one microprocessor of the intermediate computer matching the request for the loan with the lender by at least determining respective compatibility between the business entity and multiple lenders including the lender based at least in part on respective weights or rankings of multiple compatibility criteria included in or associated with the lender's profile and further by distributing or scaling the plurality of compatibility criteria specified in or associated with the lender's profile based in part or in whole upon the first compatibility criterion, the first compatibility criterion not included in or associated with the lender's profile, and one or more lender compatibility criteria in the borrower's profile.

2. The computer implemented method of claim 1, further comprising the intermediate computer generating the borrower's profile, the generated profile being enhanced based at least in part upon electronic data of the financial management system.

3. The computer implemented method of claim 1, the process further comprising:
    the intermediate computer ensuring correctness of the electronic data from the financial management system;
    the intermediate computer determining or identifying a rank, order, or weight of a specified criterion in the lender's profile; and
    the intermediate computer processing an unspecified lending criterion that is not specified in or associated with the lender's profile.

4. The computer implemented method of claim 3, processing the unspecified lending criterion in the lender's profile comprising
    the intermediate computer identifying the unspecified lending criterion that is not specified in or associated with the lender's profile; and
    the intermediate computer determining whether the identified unspecified lending criterion causes an impact on fulfillment of the request for the loan by the lender.

5. The computer implemented method of claim 3, processing the unspecified lending criterion in the lender's profile comprising the intermediate computer identifying an average order, rank, or weight for the unspecified lending criterion for the lender.

6. The computer implemented method of claim 3, processing the unspecified lending criterion in the lender's profile comprising the intermediate computer distributing or scaling existing, specified lending criteria without considering the unspecified lending criterion.

7. The computer-implemented method of claim 3, processing the unspecified lending criterion in the lender's profile being based at least in part upon the intermediate computer receiving an input from the lender regarding the unspecified lending criterion.

8. The computer implemented method of claim 1, the financial management system comprising a tax preparation application accessed by the intermediate computer and utilized by the business entity to prepare or file an electronic tax return of the business entity with a tax authority.

9. The computer implemented method of claim 1, the financial management system comprising an accounting application accessed by the intermediate computer and utilized by the business entity.

10. The computer implemented method of claim 1, the borrower's profile being generated by the intermediate computer on behalf of the business entity based at least in part upon electronic data of the financial management system.

11. The computer implemented method of claim 1, the process further comprising:
   the intermediate computer receiving or identifying lender's authorization for transmitting lender's data to the business entity;
   the intermediate computer receiving or identifying business entity's authorization for transmitting business entity data to the lender; and
   the intermediate computer providing a dedicated communication channel between the business entity and the lender.

12. The computer implemented method of claim 1, the process further comprising:
   the intermediate computer identifying a commitment of the lender to fund a portion of the loan amount requested by the business entity, in which the portion funded does not entirely fulfill the request; and
   the intermediate computer aggregating the commitment of the lender in lender's data before presenting the lender's data to the business entity.

13. The computer implemented method of claim 1, the process further comprising:
   the intermediate computer identifying or receiving other respective profiles of other lenders;
   the intermediate computer matching the request with the other lenders based at least in part upon one or more pre-determined compatibility criteria of the borrower's profile and the other respective lender profiles;
   the intermediate computer identifying respective commitments for other respective portions of the loan amount from other respective lenders; and
   the intermediate computer allocating the loan amount among the other respective lenders.

14. The computer implemented method of claim 13, the process further comprising the intermediate computer determining or identifying respective security interests of the other respective lenders.

15. The computer implemented method of claim 13, the process further comprising the intermediate computer aggregating respective lender's data for the one or more other lenders and the lender into the lender's data before presenting the lender's data to the business entity.

16. The computer-implemented method of claim 1, further comprising:
   the intermediate computer dividing the loan amount into a plurality of smaller loan amounts;
   the intermediate computer identifying a plurality of lenders; and
   the intermediate computer fulfilling the request for the loan by matching the plurality of lenders with the plurality of smaller loan amounts based at least in part upon respective lender's profiles of the plurality of lenders and the plurality of smaller loan amounts.

17. The computer-implemented method of claim 1, further comprising:
   the intermediate computer modifying the request for the loan to improve a standing of the business entity in front of lenders.

\* \* \* \* \*